United States Patent
Robertson et al.

(10) Patent No.: US 10,491,322 B2
(45) Date of Patent: Nov. 26, 2019

(54) OPTICAL SWITCHING SYSTEMS

(71) Applicant: Roadmap Systems Ltd, Cambridge (GB)

(72) Inventors: Brian Robertson, Cambridge (GB); Daping Chu, Cambridge (GB); Haining Yang, Cambridge (GB); Peter John Wilkinson, Cambridge (GB)

(73) Assignee: Roadmap Systems Ltd, Cambridge (GB)

( * ) Notice: Subject to any disclaimer, the term of this patent is extended or adjusted under 35 U.S.C. 154(b) by 0 days.

(21) Appl. No.: 15/762,137

(22) PCT Filed: Sep. 19, 2016

(86) PCT No.: PCT/GB2016/052912
§ 371 (c)(1),
(2) Date: Mar. 22, 2018

(87) PCT Pub. No.: WO2017/051157
PCT Pub. Date: Mar. 30, 2017

(65) Prior Publication Data
US 2018/0278359 A1 Sep. 27, 2018

(30) Foreign Application Priority Data

Sep. 23, 2015 (GB) .................................. 1516862.8

(51) Int. Cl.
*H04J 14/02* (2006.01)
*H04Q 11/00* (2006.01)

(52) U.S. Cl.
CPC ........ *H04J 14/021* (2013.01); *H04J 14/0212* (2013.01); *H04Q 11/0005* (2013.01);
(Continued)

(58) Field of Classification Search
CPC combination set(s) only.
See application file for complete search history.

(56) References Cited

U.S. PATENT DOCUMENTS 5,121,231 A * 6/1992 Jenkins .................... G02B 5/32
359/10
5,416,616 A * 5/1995 Jenkins .................... G02B 5/32
359/10
(Continued)

FOREIGN PATENT DOCUMENTS

WO 2012/123715 A1 9/2012

OTHER PUBLICATIONS

O'Brien et al., "Dynamic Holographic Interconnects That Use Ferroelectric Liquid-Crystal Spatial Light Modulators", "Applied Optics", May 10, 1994, pp. 2795-2803, vol. 33, No. 14, Publisher: Optical Society of America, Published in: Washington, USA.
(Continued)

*Primary Examiner* — Omar S Ismail
(74) *Attorney, Agent, or Firm* — Loginov & Associates, PLLC; William A. Loginov

(57) ABSTRACT

A wavelength division multiplexed (WDM) reconfigurable optical switch. The switch has a set of arrays of optical beam connections, each comprising an array of optical outputs and having an optical input to receive a WDM input optical signal; a first diffractive element to demultiplexed the WDM input optical signal into a plurality of demultiplexed optical input beams, and to disperse said demultiplexed optical input beams spatially along a first axis; first relay optics between the set of arrays of optical beam connections and the first diffractive element; and a reconfigurable holographic array comprising a 2D array of reconfigurable sub-holograms defining sub-hologram rows and columns. The arrays of said set of arrays and the sub-hologram rows and columns are arranged and aligned in particular ways so that wavelength channels of the WDM input signal for each array can be steered within the device towards a selected optical output.

13 Claims, 11 Drawing Sheets

(52) U.S. Cl.
CPC ........... *H04Q 2011/0016* (2013.01); *H04Q 2011/0026* (2013.01); *H04Q 2011/0028* (2013.01); *H04Q 2011/0039* (2013.01)

(56) References Cited

U.S. PATENT DOCUMENTS

| | | | |
|---|---|---|---|
| 7,145,710 B2 * | 12/2006 | Holmes | G02B 5/32 359/279 |
| 7,397,980 B2 * | 7/2008 | Frisken | G02B 6/2713 385/15 |
| 7,664,395 B2 | 2/2010 | Holmes | |
| 2002/0131690 A1 * | 9/2002 | Belser | G02B 6/2931 385/24 |
| 2004/0080733 A1 * | 4/2004 | Shiraishi | G03B 27/42 355/53 |
| 2009/0028503 A1 * | 1/2009 | Garrett | G02B 6/29311 385/18 |
| 2011/0280573 A1 * | 11/2011 | Collings | G02F 1/295 398/48 |
| 2012/0163825 A1 * | 6/2012 | Wu | G02B 6/29313 398/85 |
| 2012/0219252 A1 * | 8/2012 | Marom | G02B 6/3556 385/16 |
| 2014/0355985 A1 * | 12/2014 | Chu | G02F 1/292 398/49 |
| 2015/0208144 A1 * | 7/2015 | Holmes | H04J 14/02 398/48 |

OTHER PUBLICATIONS

Okuno et al., "Recent Progress in Optical Switches Based on Planar Lightware Circuit Technology", 2002, pp. 55-56, Publisher: IEEE Conference.

* cited by examiner

— side view —

— top view —

— system view —

OPTICAL SWITCHING SYSTEMS

FIELD OF THE INVENTION

This invention relates to systems and methods for switching/routing optical signals, in particular wavelength division multiplexed (WDM) signals.

BACKGROUND TO THE INVENTION

There is a general desire to improve the capacity of switches/routers in optical telecommunication systems. One approach is to employ wavelength division multiplexed signals and wavelength selective switches (WSSs), which may be employed in a reconfigurable optical add/drop multiplexer (ROADM) or the like. Another approach to employ data encoding based upon polarisation, and U.S. Pat. No. 7,397,980 describes a switching device for such signals. Further background prior art can be found in U.S. Pat. No. 7,397,980; in U.S. Pat. No. 7,664,395; and in M. Okuno and H. Takahashi, "Recent Progress in Optical Switches Based on Planar Lightwave Circuit Technology", NTT paper at IEEE Conference on All-Optical Networking, WD2-55 (2002). However there is a general need for improvement on the prior art approaches.

SUMMARY OF THE INVENTION

According to the present invention there is therefore provided a wavelength division multiplexed (WDM) reconfigurable optical switch, the switch comprising: a set of arrays of optical beam connections, each comprising an array of optical outputs and having an optical input to receive a WDM input optical signal; a first diffractive element to demultiplex said WDM input optical signal into a plurality of demultiplexed optical input beams, and to disperse said demultiplexed optical input beams spatially along a first axis; first relay optics between said set of arrays of optical beam connections and said first diffractive element; and a reconfigurable holographic array comprising a 2D array of reconfigurable sub-holograms defining sub-hologram rows and columns; wherein said arrays of said set of arrays are at least one dimensional arrays extending spatially in a direction parallel to said first axis and arranged in a column defining a second axis orthogonal to said first axis; wherein said sub-hologram rows are aligned along said first axis, and wherein said sub-hologram columns are aligned along said second axis; wherein a number of said sub-hologram rows corresponds to at least a number of arrays in said set of arrays; and wherein each sub-hologram row is configured to receive a set of demultiplexed optical input beams at different carrier wavelengths demultiplexed from the optical input for the array of the set of arrays to which the row corresponds; wherein each of said sub-holograms in a sub-hologram row is reconfigurable to steer a respective wavelength channel of the WDM input signal for the array to which the sub-hologram row corresponds, towards a selected said optical output for the array; and wherein each said sub-hologram row is configured to steer the demultiplexed optical input beams for a respective array of the set of arrays of optical beam connections.

Embodiments of such an arrangement can substantially increase the data handling capacity of an optical switch. Although tiling a spatial light modulator (SLM) with a 2D array of relatively small holograms might appear to result in a loss of resolution in the output image plane, in fact the resolution can effectively be maintained if the spacing of the points in the output image plane is relatively smaller—that is, if in embodiments, the optical outputs are relatively close together. In general it is preferable though not essential to include further measures to reduce crosstalk, and we describe later techniques by which crosstalk can be mitigated.

In embodiments the arrays of optical outputs are at least one dimensional arrays extending parallel to the first axis (of wavelength dispersion), and a system of this type can, for example, be implemented on a planar or substantially planar optical circuit or substrate. However in preferred embodiments the arrays of optical outputs are 2D arrays (that is, the outputs are arranged over a region extending over in two dimensions), and each of a sub-holograms steers one of the demultiplexed beams in two dimensions towards the selected optical output for the wavelength/array.

In some preferred embodiments the switch has a folded optical configuration—that is the optical path between the inputs and outputs of the arrays includes a reflecting element. Typically this may be provided by employing a reflective SLM for the reconfigurable holographic array, for example an LCOS (liquid crystal on silicon) SLM. In such an arrangement preferably, though not essentially, the optical input of an array is co-planar with the optical outputs of the array, and forms part of, for example, a rectangular, square or hexagonal grid of the array. In other embodiments, however, the switch may be 'unfolded' and a transmissive SLM used for the reconfigurable holographic array. In this latter case a further diffractive element may be provided on the output side of the holographic array, and further relay optics may be employed to couple the output side to the optical outputs of the switch.

In embodiments the input/output (I/O) plane of the switch may be provided by a set of clusters of input/output ports. In embodiments these clustered ports may define a hexagonal array or grid, which is particularly convenient for interfacing to multicore optical fibre, and hence for providing compact, high-density optical signal processing.

In broad terms each array of I/O ports maps onto a row of the reconfigurable holographic array, each row performing 2D steering for one of the arrays of the set of arrays. More particularly this may be achieved by using the diffractive element to provide dispersion along a row, so that the different wavelengths of the WDM signals are each provided to a separate sub-hologram. A sub-hologram may then display a grating appropriate to the wavelength and to the 2D direction in which the (de-multiplexed) beam is to be steered. As the skilled person will appreciate, in embodiments the sub-holograms of the array may be determined by notionally subdividing a relatively high resolution SLM into sub-holograms by displaying an appropriate phase pattern on each region of n by m pixels. With such an approach the size/shape of a sub-hologram may be flexible, for example depending upon the bandwidth or data rate associated with a particular wavelength channel. For example within, say, C-band, a particular channel may be allocated twice the usual data rate and twice the usual bandwidth, in which case the sub-hologram associated with that wavelength/channel may have twice the width (along the direction of a row). In this way the optical configuration we describe enables the switch to be adaptive to the particular data rates used on the channel.

As the skilled person will appreciate, modulation of a wavelength channel of the input optical beam will result in a beam with an elongate shape when the multiplexed signal is demultiplexed by the diffractive element. The cross-section of a de-multiplexed beam is thus elongated, in particular with a long axis lying along the above described first axis. Thus in embodiments the steering, in preferred embodiments in two dimensions, comprises deflecting such a demultiplexed optical input beam in a direction parallel to this axis (as well as orthogonal to this axis, depending upon the particular direction needed for the selected optical output).

In embodiments the SLM employed may be a high-resolution LCOS SLM, for example having a resolution of one to a few thousand pixels (or higher) in each direction. Individual sub-holograms may, however, be relatively small, for example of order 50×50 pixels say, in the range 20 to 200 pixels on each side (in embodiments the sub-holograms may be substantially square in terms of pixel count and/or physical dimensions). In embodiments a sub-hologram pixel may be able to display, 64, 128 or more phase levels. In preferred embodiments of the systems described herein the hologram is a phase hologram or kinoform.

In some embodiments of the switch the relay optics may include non-telecentric optics such that output beams from the holographic array, as they propagate towards the output arrays, define directions which diverge away from an optical axis of the switch. Thus in some embodiments of the optical switch the optical input of an array defines an input axis and a steered output beam from the relay optics, directed towards an optical output of the array, has an axis which diverges away from this input axis (in a direction of light propagation from the optical output). Thus in broad terms in such embodiments the output beams diverge away from an optical axis of the switch. Optionally the optical outputs of an array of optical beam connections may then also have axes which (each) diverge away from the optical axis or, for example, a lens (lenslet) array may be used to couple, more particularly focus, into an array of optical beam connections. In this latter case the lenslets may be offset to direct the output beams to afterwards lie substantially parallel to the optical axis. These techniques can help to reduce crosstalk in the system.

In other embodiments the switch may additionally incorporate telecentric magnification optics to provide the output beams with increased mutual spatial separation. In such embodiments the system may have a virtual output array plane, in particular to provide a virtual image of the set of arrays of optical beam connections. The telecentric magnification optics may then be provided between this virtual output array plane and the actual optical beam connections. Preferably in such an arrangement a further lens or lenslet array is provided between the magnification optics and an array of optical outputs, to couple, more particularly focus, the magnified (and hence more spatially separated) beams into the output array.

In these and other embodiments a lenslet array may also be included prior to the (input/)output ports (fibre array) in the optical path to compensate for varying beam diffraction angles (angles φ(θ'(p)) later). Where output to fibre array is employed (the output ports comprise or consist of a fibre array), in particular where the fibre axes are parallel to the optical axis, for example if a multicore fibre is used, a single lenslet may be provided (fabricated) on the end of each fibre.

Additionally or alternatively the input axis may be tilted with respect to an optical axis of the system, more particularly with respect to an optical axis of the reconfigurable holographic array, so that a zeroth order beam reflected from the holographic array avoids re-entering the optical input. This helps to avoid the need for input port isolation (to mitigate back-reflections). In embodiments where the optical input is part of the same array as the optical outputs, typically the case for a reflective SLM/folded optical system, the optical input may be offset from the centre of the array. Then, in embodiments, the zeroth order beam may be dumped, for example into an unused optical output, which may be at the centre of the array.

As previously described, in some preferred implementations each sub-hologram defines a phase grating, configured to direct light of the wavelength band selected by the position of the sub-hologram in its row towards a selected optical output of the array of optical outputs. Thus in preferred embodiments the system includes a driver coupled to the SLM to drive the SLM with an appropriate set of sub-holograms according to the selected outputs for the various different wavelength components of the inputs. Since a relatively small number of holograms/gratings is needed, optionally these may be pre-calculated and corresponding phase data stored in non-volatile memory, so that a particular hologram/grating may be selected as needed. In embodiments the driver includes a processor to receive switch control data defining which wavelengths are to go to which outputs, and the processor then selects holograms for display accordingly. Such a processor may be implemented in software, or in hardware (for example as a gate array or ASIC), or in a combination of the two.

Although the individual sub-holograms may in principle be simple gratings, optionally they may also incorporate phase information for wavefront modification/correction. For example optical distortion within the switch could be measured (either for a reference device or for each individual device) and at least partially corrected in the displayed hologram data. Crosstalk may be mitigated in a similar manner. Additionally or alternatively crosstalk may be reduced by the techniques we have previously described in WO2012/123715 (hereby incorporated by reference in its entirety). In broad terms the switch may deliberately incorporate a "distorting" optical element, for example an element which provides defocus (say an axicon). Then this distortion or defocus may be corrected in a displayed sub-hologram so that a particular, selected diffraction order (such as +1 or −1) is corrected, to reduce the coupling of one or more other unwanted diffraction orders into an optical output other than the selected optical output (which can otherwise be a particular problem where the outputs are regularly spaced).

Embodiments of the above described system can be employed to direct a selected wavelength of a WDM signal to a selected optical output of the switch. In this regard it may be thought of as a form of demultiplexer. In a corresponding manner the optical paths through the device may be reversed so that the switch can operate as a multiplexer or combiner.

Thus in a complementary aspect the invention provides a reconfigurable optical switch, the switch comprising: a set of arrays of optical beam connections, each having an optical output to provide a WDM output optical signal and comprising an array of optical inputs, each to receive an input beam of a different centre wavelength; a first diffractive element to disperse input beams from said set of arrays spatially along a first axis; first relay optic between said set of arrays of optical beam connections and said first diffractive element; a reconfigurable holographic array comprising an array of reconfigurable sub-holograms defining sub-hologram rows and columns; wherein said arrays of said set of arrays are at least one dimensional arrays extending spatially in a direction parallel to said first axis and arranged in a column defining a second axis orthogonal to said first axis; wherein said each sub-hologram rows are aligned along said first axis, and wherein said sub-hologram columns are aligned along said second axis; wherein a number of said sub-hologram rows corresponds to a number of arrays in said set of arrays; wherein each sub-hologram row is configured to receive said dispersed input beams from one of said arrays of optical inputs; and wherein each of said sub-holograms in a sub-hologram row is reconfigurable to steer a respective input beam, in one or preferably two dimensions, towards the optical output of the array to which the sub-hologram row corresponds.

Again the switch (multiplexer or combiner) preferably has a folded configuration, for example employing a reflective SLM to display the reconfigurable holographic array. However the skilled person will appreciate that it may equally be operated in an unfolded configuration, for example using a transmissive SLM.

In a similar manner to that previously described, each incoming wavelength from each array of inputs has its own sub-hologram which is configured to steer that wavelength, from the particular input to the common output for the array (which may or may not be a central output, as previously described).

A WDM reconfigurable optical switch with multiple arrays of optical outputs may be combined with a multiplexer/combiner as previously described to provide what is here referred to as an optical router. This, in embodiments, enables any wavelength at any input to be routed to any selected output.

This can be achieved, in broad terms, by connecting each optical output of each array from the switch to each optical input of each array of the multiplexer/combiner. Thus the switch can then be used to direct a selected wavelength to a selected output of the router by choosing the optical output of the switch to which it is directed. The coupling between the switch and the multiplexer combiner involves connecting each output of each array from the switch to each input of each array of the multiplexer/combiner, and this may be done in a number of different ways. For example in one approach a network of fibre optic connections is used, which may be referred to as a 'fibre shuffle network'. Alternatively the connections may be made using fibres or free-space optics. In a yet further approach the optical outputs may be arranged so that they are all substantially planar, and the connections made using a planar 'lightwave circuit'.

In a related aspect, therefore, the invention provides a WDM reconfigurable optical router comprising a WDM reconfigurable optical switch as described above, and additionally: a second set of arrays of optical beam connections, each having an optical output to provide a WDM output optical signal and comprising an array of optical inputs; wherein each optical input of said second set of arrays is optically coupled to an optical output of said set of arrays of said switch; a second diffractive element to disperse input beams from said second set of arrays spatially along a third axis; second relay optics between said second set of arrays of optical beam connections and said second diffractive element; a second reconfigurable holographic array comprising an array, preferably a 2D array, of reconfigurable sub-holograms defining second sub-holograms rows and columns; wherein said second sub-hologram rows are aligned along said third axis and wherein each second sub-hologram row is configured to receive said dispersed input beams from one of said second set of arrays; and wherein each of said sub-holograms is a second sub-hologram row is reconfigurable to steer, preferably but not essentially in two dimensions, a respective input beam towards the optical output of an array of the second set of arrays to which the second sub-hologram row corresponds.

The invention also provides a method of switching a set of wavelength division multiplexed (WDM) optical signals, the method comprising: providing a set of optical port arrays each comprising an input port to receive a WDM optical input and a set of output ports; wherein said port arrays are spatially dispersed along a second axis and said output ports of said port arrays extend at least along a first axis orthogonal to said second axis; providing light from said input ports of said port arrays to a diffractive element to disperse wavelengths of said WDM optical signals along said first axis orthogonal to said second axis to demultiplex said WDM optical signals; providing said demultiplexed optical signals to a reconfigurable holographic array comprising a 2D array of reconfigurable sub-holograms defining sub-hologram rows aligned with said first axis and sub-hologram columns aligned with said second axis such that each sub-hologram row corresponds to a said port array; and steering said demultiplexed optical signals using said reconfigurable holographic array such that each row of sub-holograms steers a set of demultiplexed wavelengths from a said array input port to a set of selected output ports of the array, and such that a set of said rows of the reconfigurable holographic array steers the demultiplexed wavelengths of said set of port arrays.

Again as previously described, in some preferred embodiments the fibre arrays, more particular the output ports of the fibre arrays, extend in two dimensions, that is along each of the first and second axes, and the sub-holograms steer the demultiplexed optical signals in two dimensions towards the selected output ports. However in other embodiments a fibre array, more particularly a set of output ports of a fibre array, may only extend along the first axis, that is in a direction of wavelength dispersion by the diffractive element, and the sub-holograms may then steer the demultiplexed optical signals by deflecting the demultiplexed beams parallel to this direction, more particularly deflecting the beams in a plane comprising this direction. Embodiments of this latter type may be useful, for example, for implementation on a substantially planar substrate.

As previously described, in some embodiments of the method optical axes of the output beams (or ports/fibres) may be tilted with respect to an optical axes of the input port of the fibre or other arrays (although each array may still share a lenslet). In embodiments this helps to reduce cross-talk and to increase diffraction efficiency. Additionally or alternatively in embodiments the input port may be offset from a centre of an array. Then a zeroth order reflection from the reconfigurable holographic array may be captured or dumped, for example in an unused output port of the array. These techniques generally facilitate the use of an array of sub-holograms, which tend to have a reduced range of angular deflection resulting in a more tightly packed holographic replay field.

In some embodiments the output ports of an array are arranged in a hexagonal close-packed configuration, which again facilitates efficient operation, as well as convenient coupling to a multicore fibre.

Again as previously described the number of sub-holograms in a row may be adapted, in embodiments in real time, to the bandwidth(s) of the signals within the WDM optical signal. Optionally, again, suitably sized sub-holograms may be precalculated and stored in non-volatile memory. In general steering using the reconfigurable holographic array comprises defining a set of gratings, more particularly phase gratings, on a spatial light modulator, preferably a reflective SLM such as an LCOS SLM. Typically a single grating is displayed for each sub-hologram.

As previously described, the method may be used 'in reverse' so that the input port of an array becomes an output port and so that the output ports become input ports, to provide a method of multiplexing or combining optical signals. This method may then be concatenated with the method switching optical signals described above, by connecting each output port to a respective input port of the next stage. This combination may then be employed as a method of N by N routing of N optical signals each with a plurality (C) of different wavelengths, where C may but need not necessarily equal N.

Thus in embodiments the above described method further comprises providing a second set of optical port arrays, each comprising an output port and a set of input ports, wherein said second set of optical port arrays is spatially dispersed along a fourth axis; coupling each set of output ports of said set of port arrays to said input ports of said second set of port arrays; providing light from said input ports of said second set of port arrays to a diffractive element to provide dispersion along a third axis orthogonal to said fourth axis; providing said dispersed light from said input ports of said second set of port arrays to a second reconfigurable holographic array comprising a 2D array of reconfigurable sub-holograms defining sub-holograms rows aligned with said third axis and sub-hologram columns aligned with said fourth axis; and steering the dispersed light from each input port of a port array of the second set of port arrays, in two dimensions using said second reconfigurable holographic array, towards the output port for the port array.

The invention still further provides a stacked, wavelength division multiplexed (WDM) reconfigurable optical switch, the switch comprising: a stacked plurality of clusters of optical connections, each comprising an optical input and a plurality of optical outputs; and a beam-steering spatial light modulator configured to display a plurality of rows of sub-holograms, one per cluster of optical connections, wherein different wavelength components of the optical inputs are dispersed along the rows, and wherein the rows are stacked in the same direction as said clusters of optical connections; and a dispersive optical element on an optical path between said clusters of optical connections and said spatial light modulator to provide said wavelength dispersion; and wherein the switch further comprises: a plurality of lenslet arrays, one per cluster of optical connections, each to couple a respective cluster of optical connections to said spatial light modulator, wherein each lenslet array creates a common plane where input/output beams of the switch overlap at different angles with respect to the optical axis.

Preferably a relay optical system images a plane of the spatial light modulator at the common plane. In preferred embodiments the sub-holograms are substantially square. Advantageously, in embodiments the clusters of optical connections comprise hexagonally-packed clusters of fibres or fibre connections.

The skilled person will appreciate that the features of embodiments of the initially described WDM switch/router may also be correspondingly incorporated into the later described aspects of the invention, including the above-described methods.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1A:
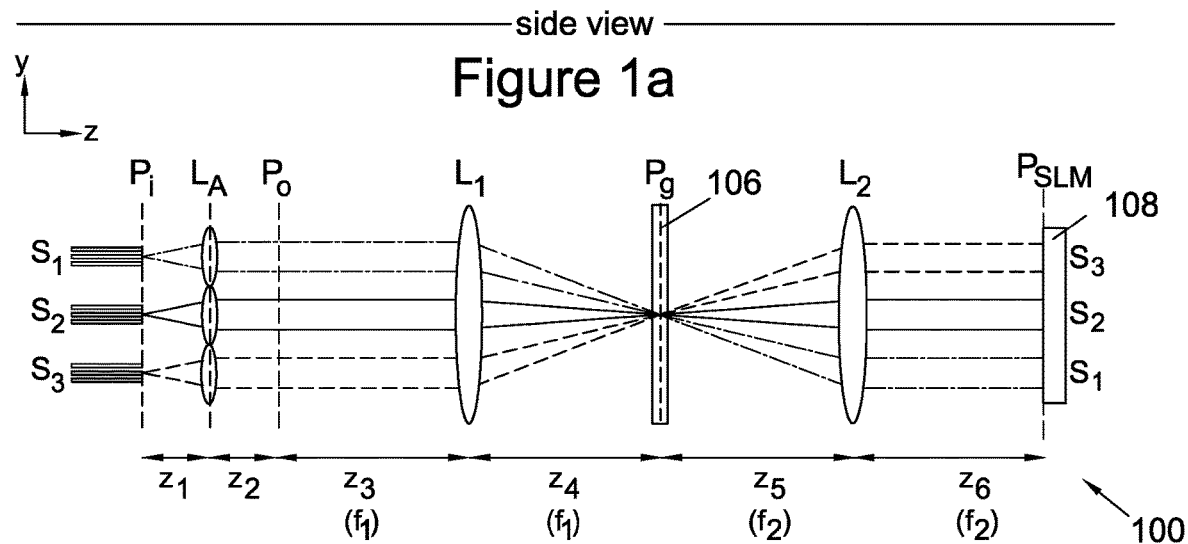
FIGS. 1a to 1d illustrate an embodiment of a wavelength division multiplexed (WDM) reconfigurable optical switch according to the invention illustrating, respectively, a side view of the switch, a top view of the switch, an array of input/output ports for the switch, and an illustration of the disposition of a 2D array of reconfigurable sub-holograms for the switch.
Figure 1B:
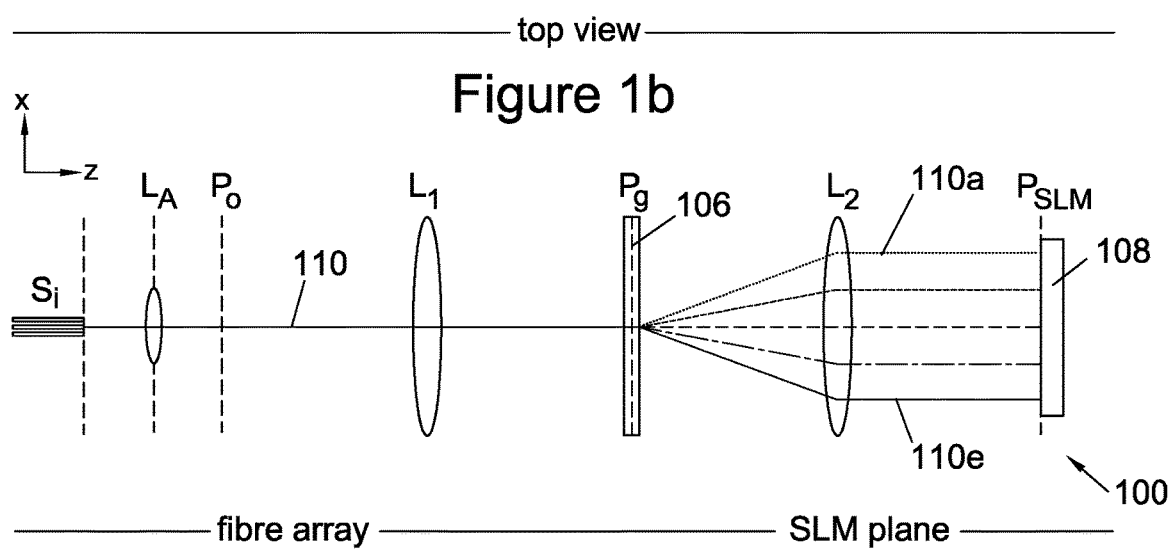
Figures 1C, 1D:
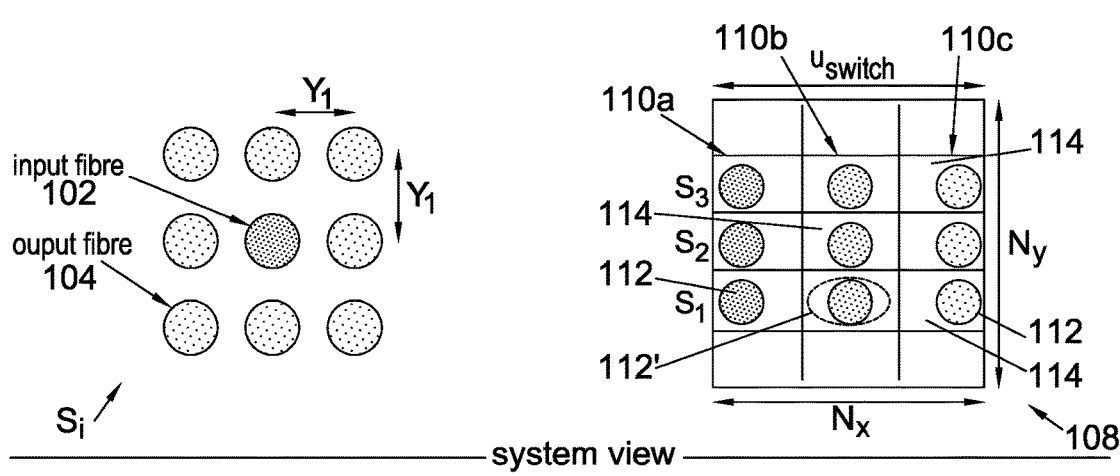
Figure 2:
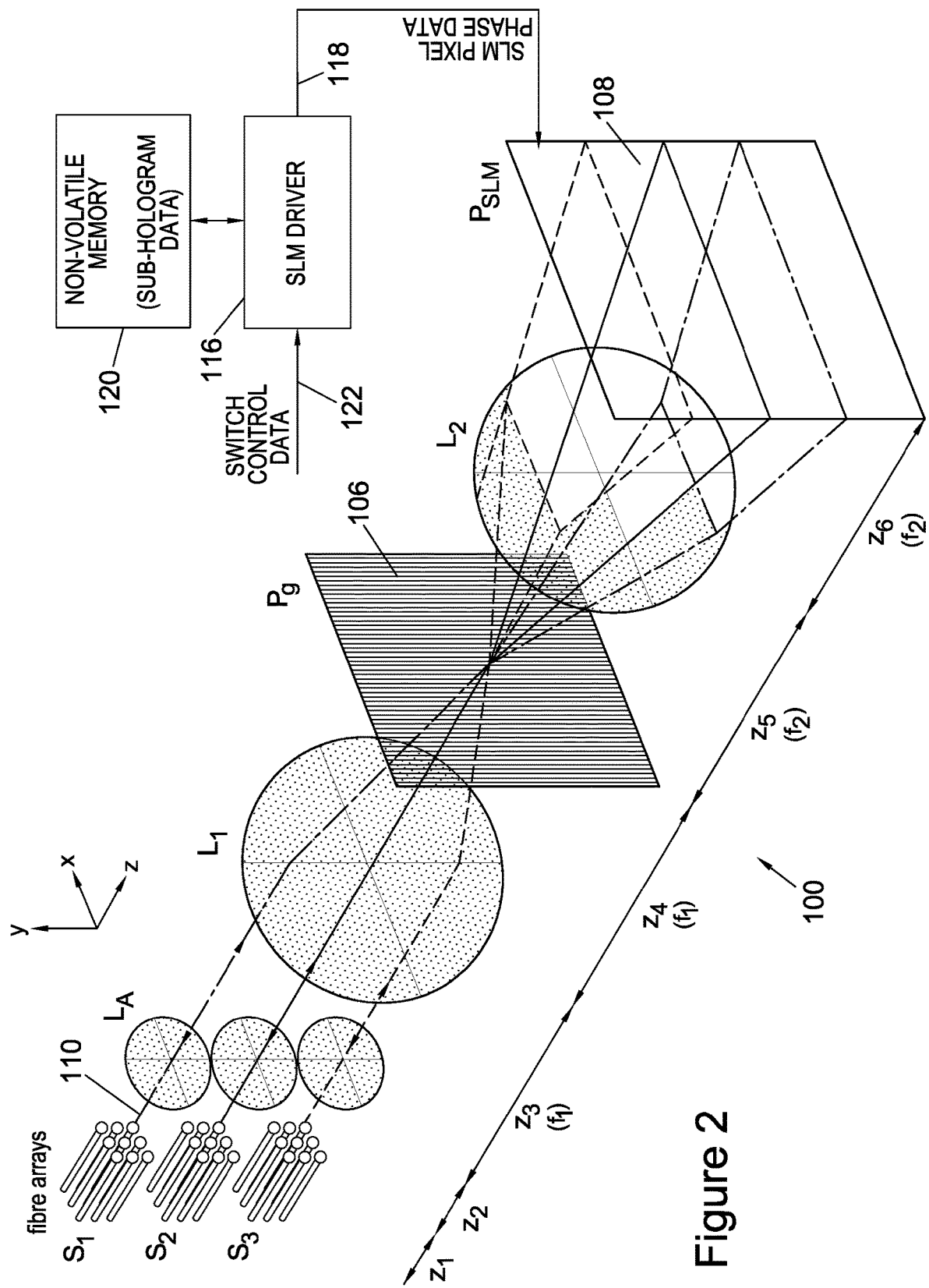
FIG. 2 shows a perspective view of the switch of FIG. 1, showing an array of stacked 1×N wavelength selective switches (WSSs)

Referring to FIGS. 1 and 2, this shows a WDM reconfigurable optical switch 100 according to an embodiment of the invention. As illustrated the switch comprises a set of M arrays of input/output ports $S_1 \ldots S_3$, of which three are shown in the figure. In the illustrated embodiment each array of ports comprises a fibre array as shown in FIG. 1c. Each array comprises an input (fibre) 102 and a set of outputs (fibres) 104, in the illustrated example on a regular square grid with spacing $Y_f$ (although in other embodiments a rectangular or hexagonal grid may be employed). As illustrated the array comprising the output fibres 104 also includes the input fibre 102, but it will be appreciated that the arrangement of FIG. 1 may be unfolded to have the input at one end and the outputs at the other end of the switch. In the illustrated example each array $S_i$ is a 3×3 array with one input and eight outputs, to therefore implement a 1×8 or 8×1 wavelength selective switch (WSS)—although it will be appreciated that other numbers of input/output ports may be employed.

As illustrated in FIG. 1 preferably, though not essentially, the fibre arrays $S_1$, $S_2$ and $S_3$ are regularly (uniformly) spaced in the y-direction; in the illustrated example M=3. In the illustrated embodiment the input and output ports lie in a common plane $P_i$. Again this is convenient but not essential since, for example, the holograms displayed on the spatial light modulator (described later) may incorporate focussing power. Thus in other arrangements, for example, the ports may be staggered in the z-direction and a displayed sub-hologram may incorporate focusing power to focus an output beam on a selected output port—which may be helpful to mitigate crosstalk.

An array of M objective lenses $L_A$ is provided on the same pitch as the input/output port arrays. These may be provided by a lenslet array. In embodiments these lenses each have substantially the same focal length $F_A$, but again this is not essential. In embodiments light from an input port 102 of, for example, a cluster of fibres is collimated by the corresponding objective lenslet of array $L_A$ at plane $P_0$. Thus, for example, an objective lenslet may expand the input mode field radius from, say, around 5 µm to around 50 µm beam waist, to cover a useful area of a sub-hologram for efficient diffraction. In FIG. 1 the terms $z_1$ and $z_2$ are the distance from the fibre array to the lenslet array, and the distance from the lenslet array to plane $P_o$ respectively, and plane $P_o$ is the plane at which the relay system images the SLM plane.

In the illustrated embodiment the system includes relay optics $L_1$, $L_2$ to either side of a grating 106 (at plane $P_g$), to image plane $P_0$ at the plane of a spatial light modulator (SLM) 108, $P_{SLM}$), and vice versa. As illustrated lenses $L_1$, $L_2$ comprise a 4f relay system which images plane $P_0$ onto the SLM via a static diffractive element 106. In the illustrated embodiment this comprises a static grating which demultiplexes the WDM input signals into a plurality of demultiplexed wavelengths, spectrally dispersing the input wavelengths across the SLM plane in the x-direction. This is illustrated in FIG. 1b where an input beam 110 is demultiplexed into a set of beams 110a-110e at different wavelengths, which illuminate separate sub-holograms on SLM 108 that independently steer each beam angularly in two dimensions.

In embodiments the SLM 108 is a reflective LCOS (liquid crystal on silicon) SLM with M rows of sub-holograms, one for each of the input/output port arrays $S_1$—that is one for each of the stacked wavelength selective switches associated with a respective input/output port array. Thus FIG. 1a shows a set of 3 stacked WSSs in which the bottom row of the SLM displays sub-holograms for $S_1$ and in which the top row of the SLM displays sub-holograms for $S_3$. FIG. 1d illustrates the SLM plane, showing dispersion of light from each of the input ports in the x-direction, and switching for each I/O array implemented by separate rows in the y-direction. Each circular region 112 illustrates a demultiplexed beam from one of the I/O arrays, which illuminates a corresponding region on SLM 108 displaying a sub-hologram to deflect the beam to a selected output port. As illustrated in FIG. 1d regions 112 are spatially separated from one another, to reduce beam overlap and are shown as having sharp edges merely for the purposes of the illustration (in practice the beam intensity will diminish somewhat gradually away from the centre of the beam). FIG. 1d also illustrates, schematically, sub-holograms 114 displayed on the SLM. In embodiments these sub-holograms may tile the SLM with substantially no gaps in between. In embodiments, (unlike the illustration) the sub-holograms may be substantially square in terms of numbers of pixels in the x- and y-directions and/or physical dimensions. More particularly, whether or not a sub-hologram region is square, in embodiments a beam impinging upon a sub-hologram has an intensity profile cross section with square symmetry.

As illustrated the demultiplexed beams 112 are shown as circular but, as the skilled person will appreciate, such a beam is modulated with data, the modulation expanding the range of wavelengths occupied by the beam. Thus a modulated beam will, in practice, be elongated in the x-direction (that is along the axis of dispersion), as schematically illustrated by profile 112'. As illustrated in FIG. 1d each demultiplexed optical channel has substantially the same bandwidth. However because the arrangement of the sub-holograms displayed on the SLM 108 is not physically constrained but is merely defined by the displayed phase data the switch may adapt to different bandwidths of the demultiplexed optical beams. This may be done by using a suitable width (in the x-direction) for a sub-hologram deflecting the beam, that is a width which matches the bandwidth of the beam. In one approach, for example, two or more regions allocated to adjacent sub-holograms in a row may be combined to display a single sub-hologram where one beam has ×2 (or ×3 or more) of the bandwidth of another beam. Thus each wavelength from each I/O array has its own respective sub-hologram displayed on SLM 108.

Referring to FIG. 2, SLM 108 may be driven by an SLM driver 116 which provides SLM data on line 118 for display, typically data defining phase levels of the pixels for displaying a plurality of kinoforms on the sub-hologram. In embodiments a sub-hologram for a wavelength may comprise a phase grating, preferably a blazed grating, in a manner well known to those skilled in the art.

Such holograms may, for example, be pre-calculated and stored in non-volatile memory 120 coupled to driver 116. Thus when the driver receives a control signal for the switch on line 122, to direct an input of array $S_i$ at a specific wavelength to a selected output, the appropriate stored sub-hologram may be selected from memory 120 for display at the position along a row corresponding to the selected wavelength. Alternatively grating data may be calculated as needed, for example using (inverse) Fourier transform hardware to calculate the grating from an inverse Fourier transform of the target diffracted spot (output beam location).

Example Sub-Hologram Phase Pattern Calculation

Many techniques may be employed to calculate a suitable sub-hologram phase pattern given a target desired output field. One example procedure is the Gerchberg-Saxton algorithm, which is illustrated by the following pseudo-Matlab code:

gin = Amplitude distribution of input field (Gaussian profile assumed)
grossout = Desired output field (the target function). For example, if we have GN addressable output points
grossout = zeros(GN);
grossout(position 1) = 1;
grossout(position 2) = 1;
Sets two points to have equal amplitude and the other points zero amplitude
gprime = Kinoform phase pattern
for ite=1:200

-continued

```
    if ite==1
        % start with result of geometrical ray-tracing (initial starting point –
FFT of input field)
            ftg=fftshift(fft(fftshift(gin)));
        else
        % All other iterations use this (FFT of input field×exp(i*phase of
        hologram))
            ftg=fftshift(fft(fftshift(gin.*exp(i.*gprime))));
        end
        % Calculate the phase of ftg (dump amplitude information)
        angle_ftg=angle(ftg);
        % Then to get the hologram phase we take the IFFT of the target
function multiplied by
            exp(i*the phase of angle_ftg)
        gprime=angle(fftshift(ifft(fftshift(grossout.*exp(i.*angle_ftg)))));
end
```

As previously mentioned, it may be desirable to incorporate focussing power within a sub-hologram, for example to reduce cross-talk. In embodiments such an approach may comprise deliberately introducing a distorting optical element and then correcting an output beam (of a desired diffraction order) to compensate for the distortion. This may leave other diffraction orders/beams uncompensated so that they remain unfocussed, again to mitigate crosstalk, in particular as described in our earlier published application WO2012/123715 (incorporated by reference). A suitable distorting element is, for example, an axicon, which introduces a ring focus.

If it is desired to introduce focussing (or defocussing) into a displayed hologram this can be achieved straightforwardly by employing a fractional Fourier transform in the above-outlined algorithm: as the skilled person will recognise, a fractional Fourier transform has an order a and reduces to a standard Fourier transform when a=1, but when a is different to unity a quadratic phase factor is added to the Fourier transform, which is the same type of factor that a lens imparts on an optical field. More generally one can calculate a suitable phase hologram pattern based on the transfer function of the optical system.

In a variant of the above-described approach an input beam may be multi-cast to multiple selected outputs simultaneously. In one approach this can be achieved simply by adding the holograms (that is adding the respective phases at each pixel location) for each selected output and displaying the combined result.

Referring again to FIGS. 1 and 2, the light diffracted from the SLM 108 is in a sense re-multiplexed (although different wavelengths are directed to different outputs) and imaged at plane $P_0$ by the relay optics $L_2$, $L_1$, and by the grating 106 at $P_g$. In the example of FIG. 1a if, say, $F_1=F_2$ then the wavefront leaving the SLM will (in an ideal system) be replicated at $P_0$. Referring to FIG. 1d, a demultiplexed beam may be steered in the x-direction (that is parallel to the axis of dispersion) and in the y-direction. The diffraction grating 106 effectively re-multiplexes the beams, and any angular displacement imposed on a beam by a sub-hologram displayed on the SLM is converted into a positional displacement at the lenslet array $L_A$. The angularly steered beams (now with a positional displacement) are focussed by corresponding lenslets in $L_A$ into a selected output port 104. Beam steering may be achieved by adjusting the period of the displayed blazed grating of a sub-hologram. In principle the lenslet array $L_A$ could be omitted but is included for coupling efficiency and system compactness.

In broad terms embodiments of the system has an input/output plane at a front focal plane of the relay optics ($L_1$, $P_g$, $L_2$) and an SLM at the back focal plane of the relay optics. However the system is configured to demultiplex WDM beams and, in effect, to spatially multiplex a group of wavelength selective switches in a direction (the y-direction) perpendicular to the direction of wavelength dispersion in the system. Thus because each I/O port array, for example each 3×3 fibre cluster, is located at a different lateral position in the y-direction, on passing through the relay lenses $L_1$ and $L_2$ and the demultiplexing grating 106 the input signals from the M (1×8) WSS input ports are dispersed in the x-direction. Moreover the input signals from the M (1×8) WSS input ports and will also be imaged at different lateral positions in the y-direction, and as a result independent rows of sub-holograms can be used to control the signal routing for each of the M switches. As shown in FIGS. 1 and 2, in embodiments the light is inverted by the 4f relay optics. (Although lenses are preferable as they provide more degrees of freedom to optimize the imaging performance of the relay system, the relay may also be implemented using mirrors).

Thus embodiments of the switch implement M individual wavelength selective switches (in the illustrated example, 1×8 switches) using a common relay system ($L_1$, $L_2$), a common demultiplexing grating 106 ($P_g$), an SLM 108, an array of M objective lenses ($L_A$), and a set of M (for example 3×3) input/output ports or fibre arrays spaced along the y-axis of the system.

We have described the switch 100 as a switch which, for each WSS, routes an input port to one (or more) selected output(s). However the skilled person will appreciate that the optical paths shown in FIGS. 1 and 2 are reversible, and thus essentially the same system may be used as a stacked set of N×1, in the illustrated embodiment 8×1, wavelength selective switches. For example a 1×8 WSS may route $\lambda_1$ and $\lambda_2$ from the central input port to output ports 2 and 4 respectively. However if one reverses the propagation of light through the system so that there are (in this example) 8 input ports and one centrally located output port, both $\lambda_1$ from port 2 and $\lambda_2$ from port 4 will be routed to the same central output port without having to change the sub-hologram phase patterns $\lambda_1$ and $\lambda_2$. Thus as long as there is no signal contention (two wavelengths of the same value entering the same WSS of the switch via different input ports), one can implement a set of N×1 wavelength selective switches.

Extending this concept, two WDM reconfigurable optical switches, each as shown in FIGS. 1 and 2, may be combined back-to-back to provide an N×N wavelength selective switch. In particular this may be achieved by connecting each output of each WSS array from the first switch to an input of each WSS of the second switch. That is, for example, a first WSS of the first switch has outputs which are connected to an input of each of the WSSs of the second switch (output one to WSS 1 of the second switch, output 2 to WSS 2 of the second switch and so forth); and each of the WSSs of the first switch is connected in this way. The optical connections may be made in any convenient manner.

Figure 3:
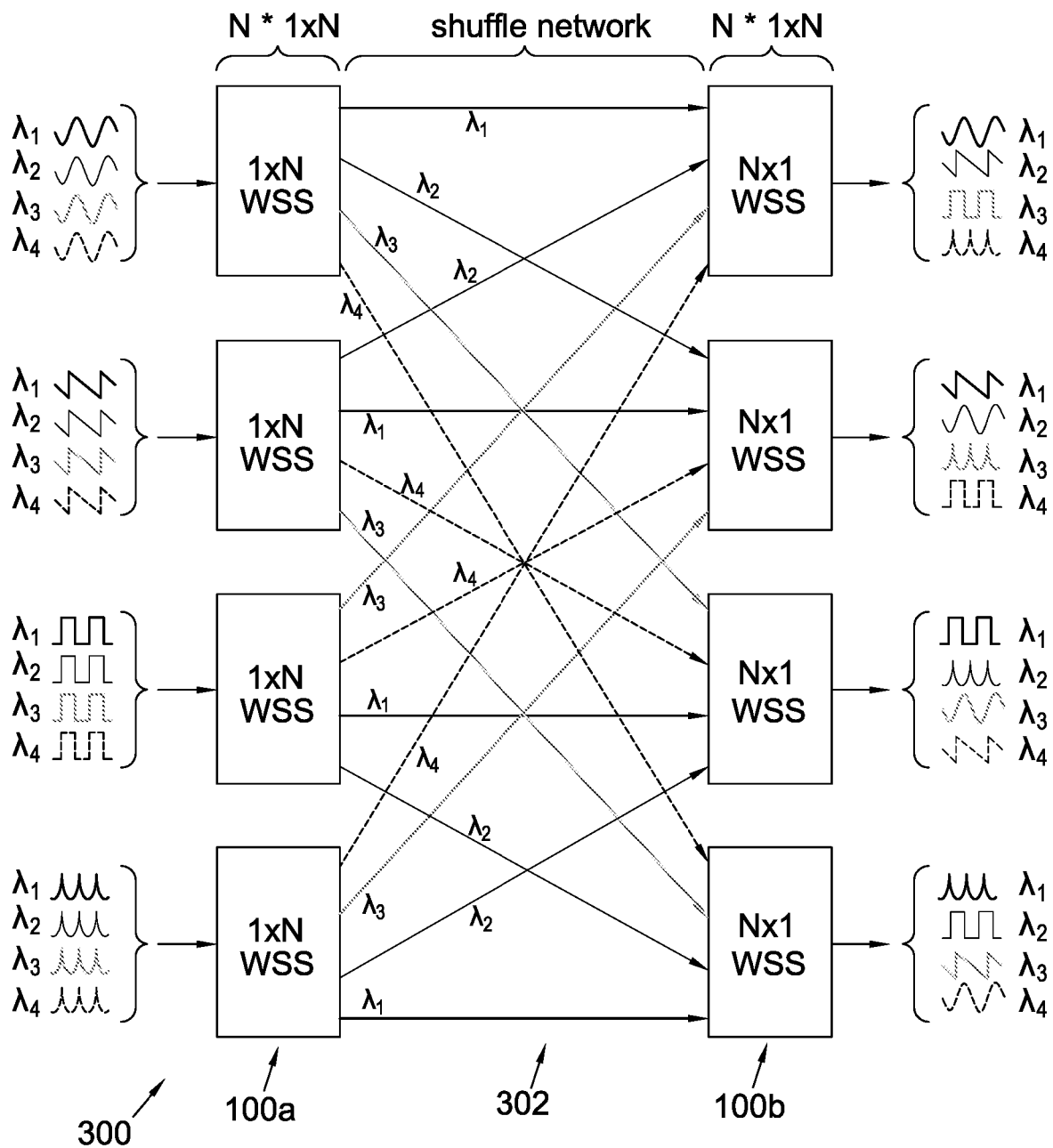
FIG. 3 shows a WDM reconfigurable optical router comprising a pair of connected switches each of the type shown in FIGS. 1 and 2, illustrating an example interconnection pattern for a N×N WSS comprising an array of input and output 1×N WSSs and a static shuffle network where example N=4, wherein the switch can be reconfigured to route any wavelength from any input port to any output port, and is contentionless.

Thus referring to FIG. 3, this shows an embodiment of an N×N wavelength selective switch or optical router 300 comprising first and second WDM reconfigurable optical switches 100a, 100b, each as previously described, connected back-to-back by a set of optical connections 302, to implement a non-blocking WSS router. The set of connections 302 may be referred to as a shuffle network ($N^2 \times N^2$), more particularly a static shuffle network, and may be implemented, for example by one or more of: a fibre shuffle network connected to the 1×N output ports and N×1 input ports; free space optics; or a planar lightwave circuit, which may include additional functionality, for example channel monitoring for active alignment. For example in embodiments a commercially available fibre shuffle network may be employed comprising individual single mode fibres laminated to a flexible substrate for mechanical rigidity, typically with the inputs and outputs are separately connectorized.

The example of FIG. 3 shows wavelength selective switches where N=4 (and uses a 16×16 shuffle network), and where the respective wavelengths are labelled $\lambda_1$ to $\lambda_4$: as can be seen the router can be reconfigured to route any wavelength from any input port to any output port. Embodiments of such a system are therefore contentionless.

In the example of FIG. 3 only four wavelengths are shown for simplicity but in practice one would use an N×N WSS with N input ports and N output ports in which each port may support C wavelength channels, where in principle C may be any number greater than 2. For example, in the case of the 4×4 WSS shown in FIG. 3, each individual input and output port might carry up to 80 signals with 50 GHz channel separation across the C-band—that is C=80. The skilled person will also appreciate that, as previously mentioned, in embodiments channels may be of variable width (wavelength range) so that, for example, a pair of adjacent channels might be combined. In such an arrangement C is variable.

The skilled person will appreciate that a routing system of the type illustrated in FIG. 3 may potentially be implemented with multiple front end switches and multiple back end switches—for example with a switch arrangement where N=4 two front-end and two back-end switches may be employed to provide an 8×8 non-blocking WDM optical router.

1. THEORY AND DETAILED EXAMPLES

We will now describe in more detail liquid crystal on silicon (LCOS) based wavelength selective switches (WSSs), more particularly the design of a stacked 1×N WSS module that can be configured to operate as:
1) A 1×N WSS.
2) A stack of 1×N WSSs.
3) An N×M WSS, or a P×Q WSS, where P≤N and Q≤N.
4) A collection of discrete 1×N, N×1, N×N, and P×Q WSSs.

Thus we will describe:
1) Basic operation:
   a. Basic operation of a 1×N WSS
   b. 1×N WSS based on elongated beams
   c. N×N WSS based on two switching planes
   d. WSSs based on LCOS and waveguide technology
   e. Flex-spectrum data format
2) Design of a stacked 1×N WSS module based on square sub-holograms:
   a. Outline of module design
   b. Design of a single 1×N WSS based on square sub-holograms
   c. Clustered output fibres
   d. Two-dimensional fibre arrangements
   e. Separation of input port from zeroth order
   f. Wavefront encoding based on filtering at the objective lens input plane
3) Design of a stacked 1×N WSS module
4) Operation of module as an N×N WSS
5) Operation of module as a collection of independent 1×N and N×N WSSs In addition, we employ the following terms:
1) A 1×N WSS has one input port and N output ports.
2) An N×1 WSS has N input ports and one output port, and is a 1×N WSS used in reverse.
3) In the case of the stacked module we have S individual 1×N WSSs.
4) An N×N WSS has N input ports and N output ports.
5) A P×Q WSS has P input ports and Q input ports. In the case of the switch module design described here, P≤N and Q≤N, where N is the maximum number of output ports a 1×N WSS can implement.

2. BACKGROUND

We first describe the realization of a 1×N WSS based on the use of elongated beams at the LCOS SLM plane, and the realization of an N×N WSS based on two separate LCOS switch planes.

2.1. Basic Operation of a 1×N WSS

Figure 4A:
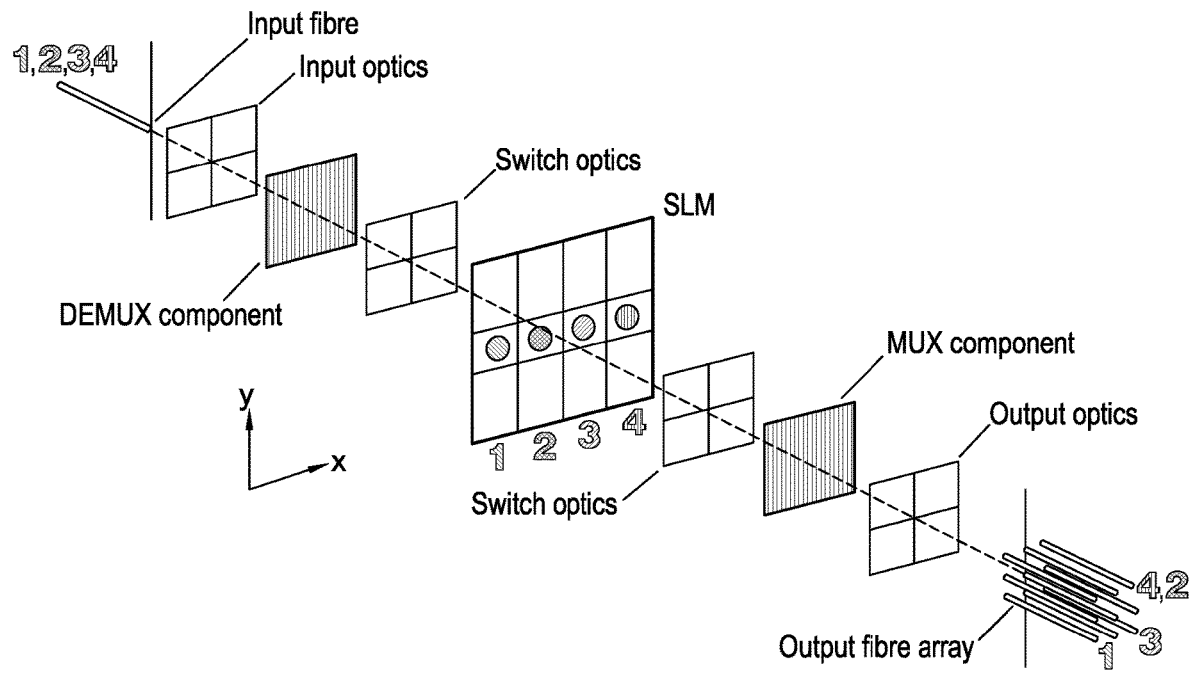
FIGS. 4a to 4c show, respectively, a functional outline of a 1×N switch based on the use of square sub-holograms at the LCOS SLM plane illustrating four signal channels being routed to four output fibres; a functional outline of a 1×N switch with elongated beams at the LCOS SLM plane illustrating four signal channels being routed to four output fibres; and an outline of an example N×M wavelength selective switch based on two LCOS switch planes where N=M=4 and each input port carries four wavelength channels.

FIG. 4a illustrates the functional optical layout of a generic 1×N WSSs, dispersing WDM wavelength channels across a LCOS phase modulating device, and using gratings to steer the signal beams to specific output fibres.

The switch comprises:
1) An input fibre.
2) Input optics, which may include polarization diversity components, and components to transform the Gaussian beam radius of the input beams to one matching the LCOS SLM sub-holograms.
3) A DEMUX component.
4) Switch optics that directs the de-multiplexed beams onto the LCOS SLM.
5) A LCOS SLM displaying an array of sub-holograms.
6) Switch optics that directs the steered beams to a MUX component.
7) A MUX component to angularly recombine the data channels.
8) Output optics, which may include polarization diversity components, and components to transform the data channels to optical modes that match the output fibre mode characteristics.
9) An output array of N output fibres.

It should be noted that, in practice, the LCOS SLM operates in reflection due to the fact that a silicon chip is used to implement the array of individually addressable electrodes that make spatial phase modulation possible. As a result, the switch is typically folded back on itself. Thus the input fibre and output fibre array are in embodiments fabricated as a single component. Similarly, in embodiments a single grating operates as both the DEMUX and MUX component, as does the input and output switch optics. This is also true for the input and output optics.

In operation:
1) Data enters the switch via a single input fibre (denoted 1, 2, 3, and 4 in this example).
1) A DEMUX component, which is typically a diffraction grating, angularly separates the data channels.
2) The switch input optics converts the light associated with each data channel into a series spatially separated Gaussian beams at the LCOS SLM plane. A corresponding series of independent sub-holograms then angularly steer the beam in two dimensions. This may be achieved by displaying quantized blazed phase gratings.
3) The steering angle is a function of both grating period and pixel size. However, in the case of a blazed grating we aim to keep the minimum number of pixels per period, $p_{min}$, greater than eight pixels in order to maximize diffraction efficiency.
4) The switch output optics directs the diffracted beams to the MUX grating whilst maintaining an angle of deflection in the xy-plane as imparted by the blazed gratings.
5) The MUX component angularly re-multiplexes the signal beams so that they effectively align whilst maintaining the angle of deflection in the xy-plane as imparted by the blazed gratings.
6) The output optics then converts these deflection angles to spatial offsets in the xy-plane. In addition, the output optics ensure that the data channels couple efficiently into the correct output fibre.

The same optical configuration shown in FIG. 4a can also be used as an N×1 WSS. To explain this, we consider the reversibility of optics. For example, as a 1×N WSS we may route $\lambda_1$ and $\lambda_2$ from the central input port to output ports 2 and 4 respectively. If we reverse the propagation of light through system so that we have eight input ports and one centrally located output port, both $\lambda_1$ from port 2 and $\lambda_2$ from port 4 will be routed to the same central output port without having to change the sub-hologram phase patterns. Thus, as long as there is no signal contention (two wavelengths of the same value entering the switch via different input ports), we can implement an N×1 WSS.

2.2. 1×N WSS Based on Elongated Beams

Figure 4B:
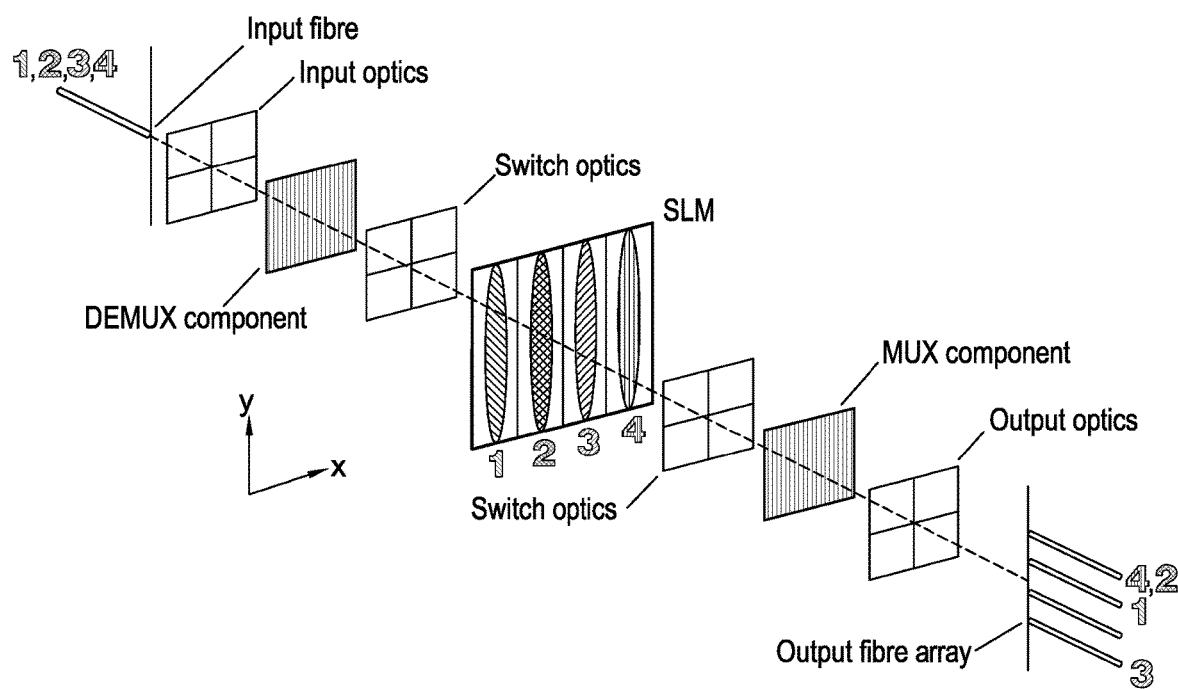

An LCOS based 1×N WSS may be constructed using anamorphic (cylindrical) switch optics to convert the input signals to elongated beams at the LCOS plane, as illustrated in FIG. 4b. This addresses the following constraints: The limited number of pixels that the current generation of HD and 2K LCOS SLM technology supports; the fact that the most effective DEMUX components are high spatial frequency gratings that disperse the light linearly (i.e., light is dispersed linearly to the x-axis); and passband-related issues: If one changes the wavelength of an unmodulated signal beam from its ideal ITU (International Telecommunications Union) grid value, the insertion loss as it transmits through the WSS will increase as the beam moves away from the centre of the sub-hologram due to clipping and subsequent diffraction effects. In practice due to the finite spectral bandwidth of a modulated data signal, and potential jitter and drift of the central carrier frequency of a specific wavelength channel, this will lead to signal errors. As a result, it is preferable to ensure that the switch design has a sufficient passband, defined as the change in central carrier frequency from its ideal ITU value that results in an increase in insertion loss of 0.5 dB, to minimally affect the data being transmitted through the switch. This sets a minimum ratio of unmodulated signal beam radius to sub-hologram width in the direction of wavelength dispersion.

For example, a 2K LCOS device is comprised of approximately 2K×1K pixels. If this has to support 80 50 GHz ITU channels, one would only be able to allocate approximately 2000/80=25 pixels per sub-hologram in the y-direction, assuming this is the direction of linear dispersion of the DEMUX element. Let us assume that there is a circular Gaussian beam of radius $w_{SLM}$ incident on a square sub-hologram of dimensions $n_x \times n_y$ pixels, where the pixel size is $\Delta \times \Delta$. Such a sub-hologram can steer in both the x and y-directions equally well, with a maximum radial deflection in the xy-plane dependent on the minimum number of pixels per grating period, $p_{min}$, we allow. As mentioned, in practice we set this value as >8 pixels in order to maximize sub-hologram diffraction efficiency.

It can be shown that the number of discretely addressable fibres that can be steered to in a direction parallel the y-axis is given by:

$$q_{max} = 2 \times \text{floor}\left(\frac{\pi}{\alpha_{SLM} \alpha_i} \frac{n_y}{p_{min}}\right) \quad (1)$$

In addition to the terms defined above:

With respect to the switch passband we define a term $\alpha_{SLM} = n_y \Delta / w_{SLM}$. This gives the ratio of the unmodulated Gaussian beam radius at a sub-hologram to the sub-hologram width. This is a key parameter in determining how cleanly transmitting data will be transmitted through the WSS, and through cascaded WSSs. To meet the passband requirements for 50 GHz channel separation, we should set $\alpha_{SLM} \geq 5$. Thus there is a trade-off between passband and steering range.

The term $\alpha_i$ defines the ratio of the spacing between fibres at the output plane, $\Upsilon$, and the Gaussian beam spot size at the output plane, $w_i$. The larger the $\alpha_i$ the more widely separated the output beams. Typically we set $\Upsilon/w_i \leq 3$ to minimize crosstalk.

As a result, a circularly symmetric Gaussian beam incident may cover at most 15 pixels at the LCOS SLM plane in both the x and y directions if we are dealing with a 2K LCOS SLM and 80×50 GHz signal channels. Setting $p_{min}=4$, $\alpha_{SLM}=5$, $\alpha_i=3$, and $n_y=25$ results in a value for $q_{max}$ of 2. Thus steering in two dimensions would give a switch capacity of 8 ports assuming the fibres are arranged on a uniform grid. However, due to the low value of $p_{min}$, the switch would have a high insertion loss and crosstalk. Increasing $n_y$ to 50 allows us to double the value of $p_{min}$, and improve performance.

By elongating the sub-holograms along the y-axis, we can increase the number of spatially distinct locations that a sub-hologram can steer to in that axis. For example, if $p_{min}=8$, $\alpha_{SLM}=3$ (in the y-direction), $\alpha_i=3$, and $n_y=500$, then $q_m>40$ (one can reduce $\alpha_{SLM}$ in the y-direction as it has no role in defining the passband). Note that we still keep $\alpha_{SLM}=5$ in the x-direction (the direction parallel to the axis of wavelength dispersion) to meet the passband requirements. One can use anamorphic (cylindrical) switch optics that simultaneously image the input fibre beam in the x-axis, and create an elongated beam along the y-axis with a Fourier-transform condition between the SLM plane and the output plane along the same axis. As a result, we can steer to a sufficiently large number of output ports in the y-direction for ROADM applications. However, a drawback of this approach is that we are unable to steer the beam in the x-direction.

It should be noted that here we make a distinction here between number of fibres that can be steered to, $q_{max}$, and the positional resolution of beam steering, defined as the minimum angular or spatial deflection of an output beam with respect to an output port. For example, we may be able to steer to 40 spatially separate fibres having a mode field radius of 5.2 µm, but with a spatial positional steering resolution of down to 0.2 µm.

2.3. N×M WSS Based on Two Switching Planes

Figure 4C:
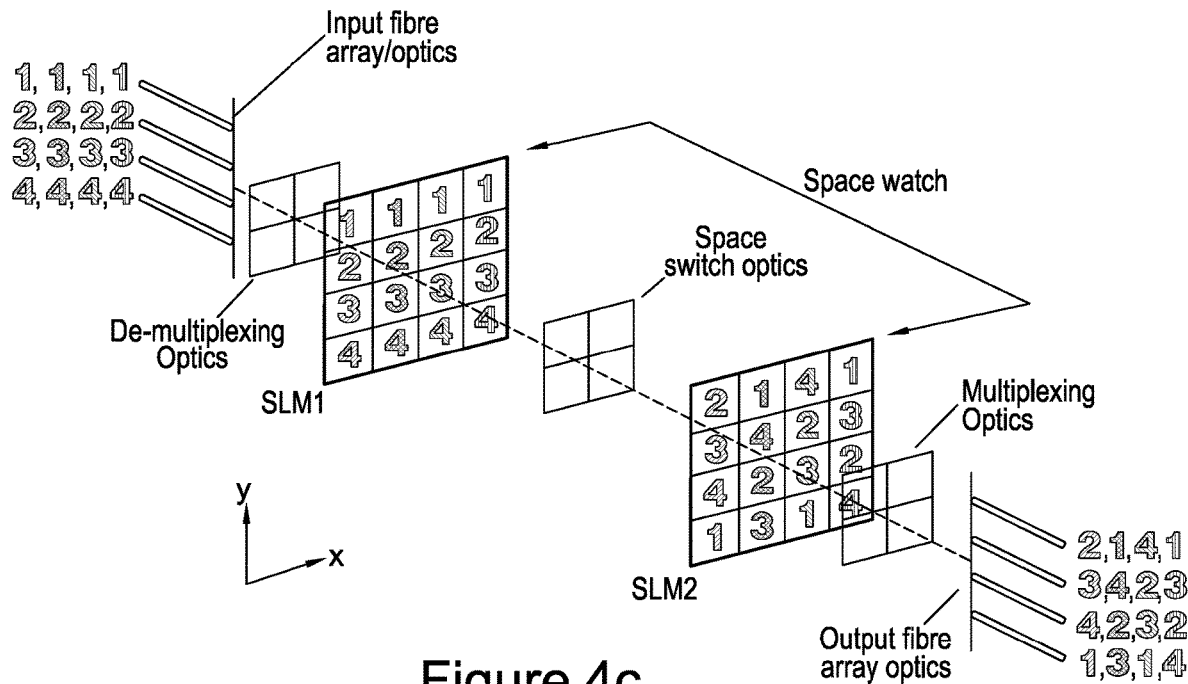

FIG. 4c illustrates the generic optical architecture of an N×M WSS based on two separate LCOS switch planes. In practice these two switch planes can be implemented on the same LCOS SLM. In the example system illustrated in FIG. 3, M=N=4. The switch comprises:

N input fibres.
Input optics, which may include polarization diversity components, and components to transform the Gaussian beam radius of the input beams.
A DEMUX component to angularly separate the data channels.
A first LCOS SLM plane.
A second LCOS switch plane.
Intermediate optics between the two switch planes.
A MUX component to angularly recombine the data channels.
Output optics.
M output fibres.

The switch operates as follows:
1) Optical data channels enter the switch via the N input fibres (denoted 1, 2, 3, and 4 in this example).
2) Each of the input beams are angularly de-multiplexed in the y-direction.
3) As a result, each wavelength channel from each input port illuminates a separate sub-hologram, with rows corresponding to a specific input fibre, and columns corresponding to a specific wavelength channel.
4) The first LCOS SLM displays gratings that angularly steer the beams in the yz-plane.
5) These beams are re-ordered in the y-direction when they are incident on the second LCOS plane.
6) A second set of blazed grating on the second LCOS plane then diffracts the beams such that when the MUX element recombines the wavelengths from a specific row, all wavelength channels propagate collinearly.
7) Output optics then focus the signal beams into one of the available M output fibres.

Although each sub-hologram can steer light in two-dimensions, to prevent signal contention in a WSS, light is only steered in the yz-plane between the two LCOS SLM planes. Such a system may be improved by considering the elongated beams at the sub-holograms, to maximize the values of N and M.

2.4. Flex-Spectrum Data Format

Currently the telecom network operates using a series of wavelength channels with pre-assigned operating frequencies, known as the ITU grid. Typical channel spacing's are 100 GHz, 50 GHz, 37.5 HGz, or 25 GHz. Flex-spectrum, also referred to as Flex-grid, is a newer standard that allows for more flexible channel allocation, allowing a higher efficiency in the use of the available spectral bandwidth. In this specification when we refer to square sub-holograms, we generally (but not exclusively) refer to an unmodulated signal that has a circular Gaussian beam profile at the sub-hologram plane. As the data rate increases, the spectral content of a channel will also increase. As a result, the width of a sub-hologram will expand in the x-direction to accommodate the wavelength channel.

3. DESIGN OF A STACKED 1×N WSS MODULE BASED ON SQUARE SUB-HOLOGRAMS

3.1. Outline of Module Design

Figure 5A:
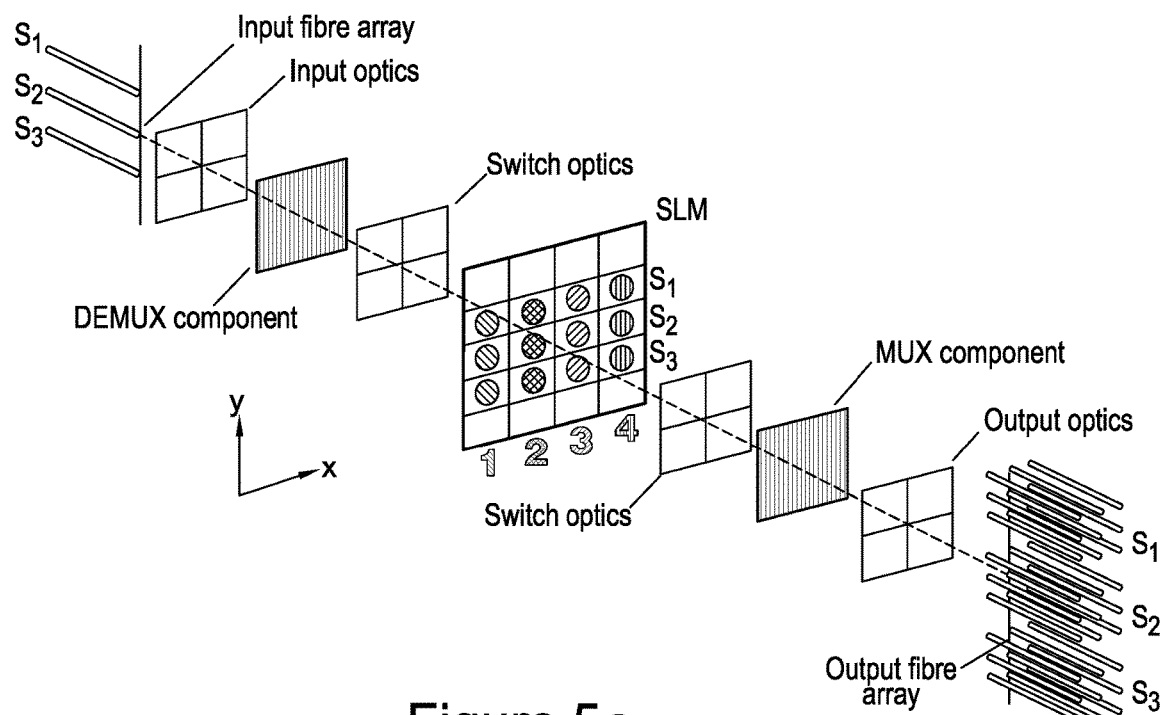
FIGS. 5a and 5b show, respectively, a generic optical system where a number of 1×N WSSs are stacked using a common LCOS SLM; and an example of a 1×N WSS based on square sub-holograms with N=8.

We now describe a WSS based on a stacked array of 1×N WSSs and square sub-holograms. Referring to FIG. 5a, this shows a 1×S array of input fibres (denoted $S_1$, $S_2$, and $S_3$ in this example), each carrying a set of WDM wavelength channels launch light into the switch. The input from each fibre is dealt with separately, and the wavelength channels from a specific input port are spatially de-multiplexed across a unique row of sub-holograms. The wavelength channels are then independently routed to a corresponding two dimensional fibre array comprised of S sub-arrays. The switch optics are designed to produce circular unmodulated signal beams at the LCOS SLM plane rather than elongated beams using anamorphic optics. These can be steered in both the x and y-directions simultaneously, rather than just in the direction perpendicular to the axis of dispersion. It is preferable (but not essential) to use an LCOS SLM with a larger pixel count to that described previously, say of order 4K×2K pixels. This increases the number of available pixels in the wavelength dispersion axis, albeit in this example only from 25 to 50 pixels (assuming 50 GHz channel spacing). Nonetheless, embodiments of the WSS approach we describe here have the potential of handling, in the case of a 4K LCOS SLM, up to forty separate 1×N WSSs, assuming square sub-hologram dimensions of 50×50 pixels for a 50 GHz frequency slot. In addition, in preferred embodiments the output fibre array is arranged as a two-dimensional structure where one can either use an S×N array of separate fibres at the output plane, or S multi-core fibres, each containing N separate fibre cores, as described later.

3.2. Design of a Single 1×N WSS Based on Square Sub-Holograms

Figure 5B:
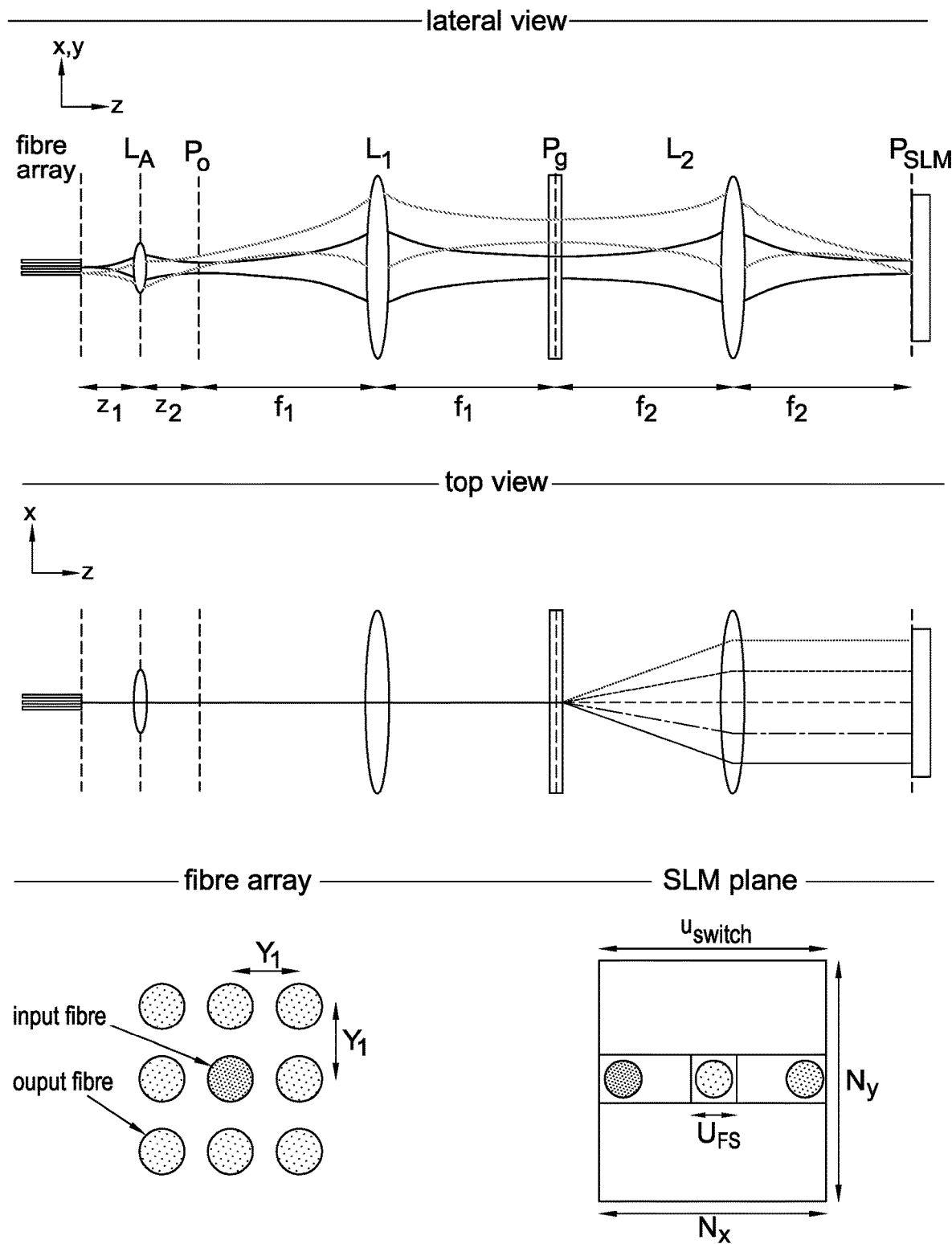
Figure 6:
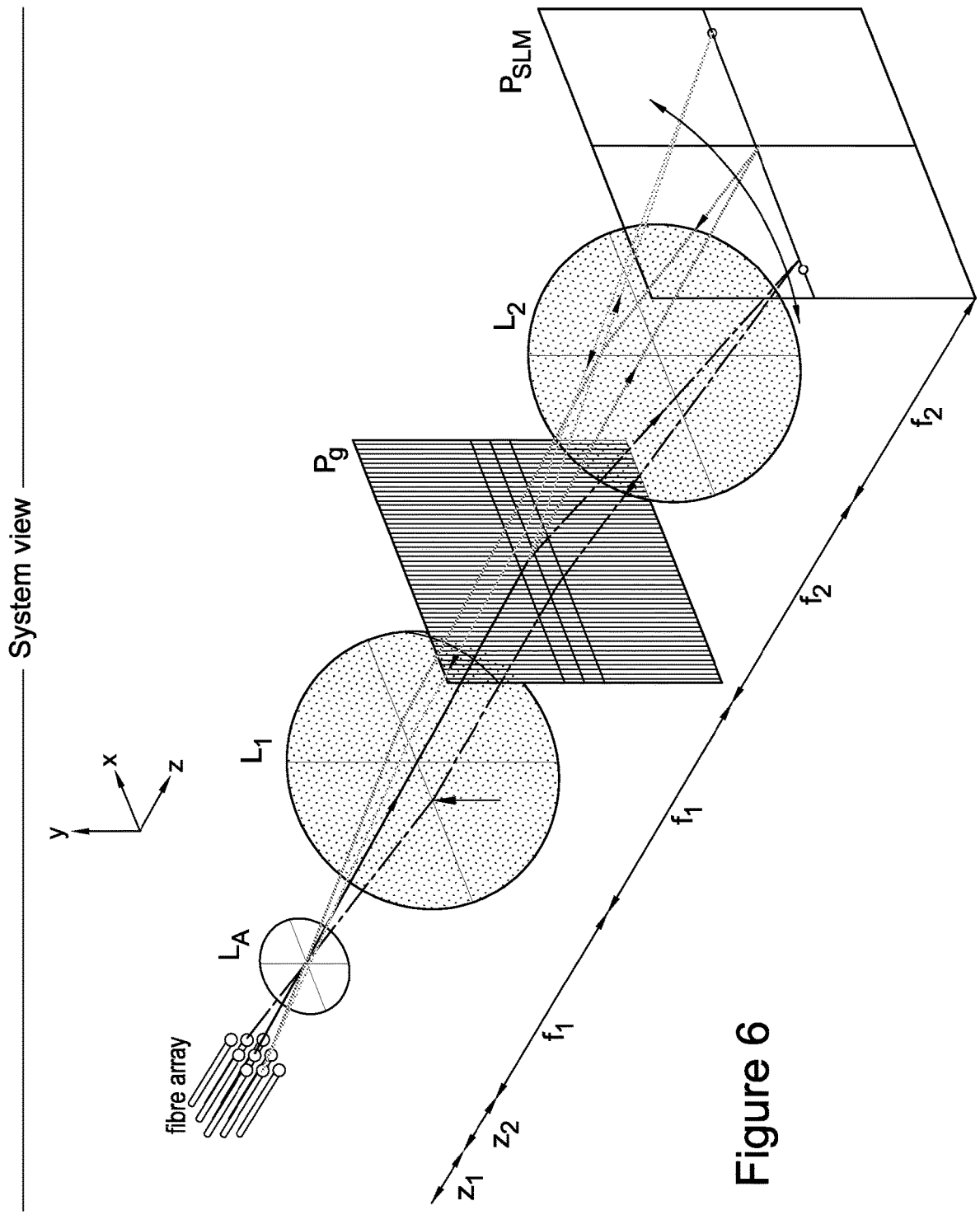
FIG. 6 shows an example of a 1×N WSS based on square sub-holograms with N=8.

Before describing the design of a stack of S 1×N WSSs, we first describe the design of a single 1×N WSS switching unit. In FIG. 5b and FIG. 6 (which shows an example functional architecture of the switch) we illustrate a 1×N optical switch based on square sub-holograms using a reflective LCOS SLM, where the C-band is dispersed across the x-axis of the LCOS SLM. For illustration we set N=8, which uses a 3×3 array of fibres. Note that the LCOS SLM may be based on ferroelectric liquid crystal material, blue phase liquid crystal material (see our WO2013/117903, incorporated by reference), or nematic liquid crystal material. In terms of operation: ferroelectric liquid crystal materials are polarization insensitive, but have an associated 3 dB loss for conventional binary phase modulation. Blue phase liquid crystal materials are also polarization insensitive. Nematic liquid crystal materials are intrinsically polarization dependent. With nematic liquid crystal materials one can use polarization diversity optics. This may be achieved using either polarization re-tracing (using the same sub-hologram for both input polarizations) or by using two separate sub-hologram rows for orthogonal polarizations. Alternatively one can use an integrated quarter waveplate to make a nematic liquid crystal LCOS SLM polarization insensitive.

With reference to FIG. 5b, the central fibre corresponds to the input port, and the remaining eight fibres correspond to the output ports. The switch comprises:

A two-dimensional 3×3 fibre array.
An objective lens $L_A$.
A 4f relay system comprising lenses $L_1$ and $L_2$.
A DEMUX grating $P_g$.
A reflective LCOS SLM positioned at plane $P_{SLM}$.

The switch embodiment operates as follows:
1) The wavelength channels are launched into the switch via the central fibre in the fibre array.
2) The objective lens, $L_A$, generates a beam waist of radius $w_o$ at plane $P_o$.
3) The relay system images this waist at the SLM plane.
4) The LCOS SLM displays a grating of period p and orientated at an angle of φ with respect to the local xy-coordinate system that diffracts the light beam such that it leaves the LCOS SLM with a propagation vector of k(p,φ).

5) This beam is imaged by the relay system at plane $P_o$.
6) The objective lens converts the propagation vector of k(p,φ) to a beam position that is offset from the optical axis.
7) The angle is controlled such that the beam is concentric with respect to the intended output fibre, thereby maximizing coupling efficiency.
8) To route each signal wavelength independently, the DEMUX grating imparts an angular displacement of $\beta_G(\lambda)$ to each signal beam. The system is preferably optimized to ensure that beams are spatially separate at the LCOS plane if their frequency spacing is $\geq v_{FS}$, where $v_{FS}$ is the minimum local frequency slot width.
9) Each signal beam is routed independently by a sub-hologram at the LCOS plane. All the beams overlap at plane $P_o$, albeit with different propagation vectors, denoted as k(p,φ,λ). As a result each wavelength can be separately routed to one of the N output fibres.

Note, for convenience we have drawn the DEMUX grating perpendicular to the incident optical axis. In reality the grating is preferably orientated at a specific angle for maximum diffraction efficiency, and the light will be dispersed about an optical axis that is not collinear with the incident optical axis. As a result, plane $P_o$ is an image of the LCOS SLM plane, and one can therefore treat the design problem as if the LCOS SLM were placed at $P_o$.

3.3. Clustered Output Fibres

It is advantageous to the switch operation to use a single lenslet element before the N output fibres, which we shall refer to as a clustered output (rather than using a coupling lenslet before each fibre).

Due to the limited number of pixels per sub-hologram we have assumed, and the limitations implied by Eq. (1), the output beams will be closely packed at the fibre array plane. For example, if we set $\alpha_i=3.0$ to maximize the number of ports that can be steered to, the beam radius at the output plane equals the mode radius of a single mode fibre. As a consequence, the output port spacing may be very small. This may be mitigated by advances in the resolution of LCOS SLMs but additionally or alternatively this may also be mitigated by one (and in principle more) of the following example techniques:

The use of a magnification stage to increase the beam separation to a point where a secondary lenslet array focuses the signal beams into spatially separated fibres.

Figure 7:
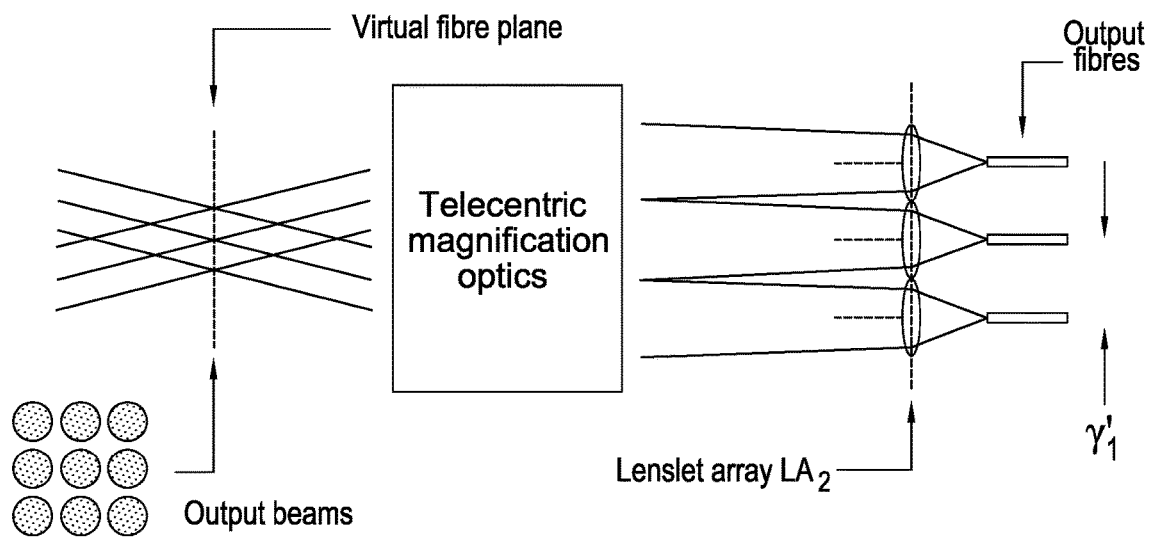
FIG. 7 shows an illustration of secondary magnification stage based on telecentric relay and secondary lenslet array to couple into output fibres.

Operation of the clustered lenslet element in a non-telecentric configuration in conjunction with a secondary lenslet to focus the signal beams into spatially separated fibres FIG. 7 illustrates how one can separate the closely packed output beams using a secondary telecentric magnification stage that has a magnification factor of M. This increases the output beam separation from $Y_f$ to $Y_f'=M \times Y_f$, and the output beam size to $Mw_0$. A secondary lenslet array, $L\lambda_2$, then focuses the beams to match the mode field radius of the output fibres.

Figure 8:
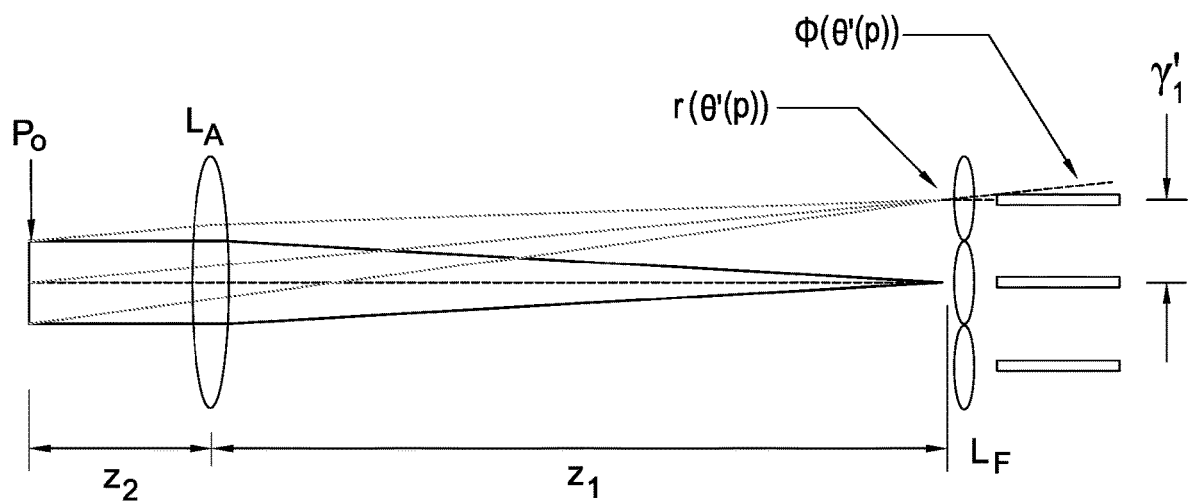
FIG. 8 shows an illustration of non-telecentric relay system.

One can also achieve a similar benefit without the use of a magnification stage by modifying the clustered output approach, as illustrated in FIG. 8. The objective lens no longer operates in a telecentric configuration. Instead, by setting $z_1 \neq f_A$ we cause the output beams to be focused at an angle of φ(θ'(p)) with respect to the optical axis. Here:

The term p is the period of the displayed grating.
$w_o$ is the incident Gaussian beam radius.
θ'(p) is the steering angle of a beam corresponding to a sub-hologram period of p at plane $P_o$ with respect to the optical axis.
r(θ'(p)) is the offset of the central Gaussian beam ray with respect to the optical axis.
φ(θ'(p)) is angle the central Gaussian beam ray makes with respect to the optical axis of the objective lens.

In terms of geometric optics we can set the object distance, $u=z_1$, and the image distance $v=z_2$. Thus the height of a specific beam with respect to the optical axis plane as a function of input deflection angle, r(θ'(p)), and the angle the central ray associated with this beam makes with respect to the optical axis, φ(θ'(p)) can be calculated as:

$$r(\theta'(p)) = \theta'(p)\left[z_1 + z_2 - \frac{z_1 z_2}{f_A}\right] \quad (2)$$

$$\phi(\theta'(p)) = \theta'(p)\left[1 - \frac{z_2}{f_A}\right] \quad (3)$$

As the beams propagate at an angle to the common optical axis of the lenslet, they have a greater physical separation at the output plane. Note that a secondary lenslet array, $L_F$, may be used to couple into the output fibres. To compensate for the angular error in the beam propagation direction, φ(θ'(p)) with respect to a fibre array that is fabricated such that the fibre axes are parallel to the optical axis, one can either, for example:

Arrange the fibres so that they are angled at φ(θ'(p)) to minimize insertion loss.

Use an array of fibres that are normal to the output plane, and offset the secondary lenslet array positions to ensure all signal beams are focused parallel to the optical axis of each fibre.

Add an additional lenslet array positioned immediately before the fibre array that compensates for the angular variation, φ(θ'(p)). The array is designed such that each lenslet either corrects for the arrangement of fibres associated with a single 1×N WSS in the stacked switch structure, or corrects for each fibre individually.

To optimize this design Gaussian beam analysis may be performed to match the beam waist to the output fibres for the output ports.

3.4. Two-Dimensional Fibre Arrangements

Being able to steer in two-dimensions in a WSS increases the flexibility in choosing the output fibre geometry. Examples of square packed and hexagonally packed fibre arrangements which may be used with the system are shown in FIGS. 9(a) and 9(b) respectively. Here it is assumed that the zeroth order is focused at the centre of the fibre arrangement. An advantage of the hexagonal arrangement is that one can increase N for a given maximum beam deflection angle. For example, for a 4K LCOS one can increase N from 8 to 12 by this rearrangement, assuming a minimum average grating period of 7.5 pixels per period instead of eight pixels per period.

Figure 10:
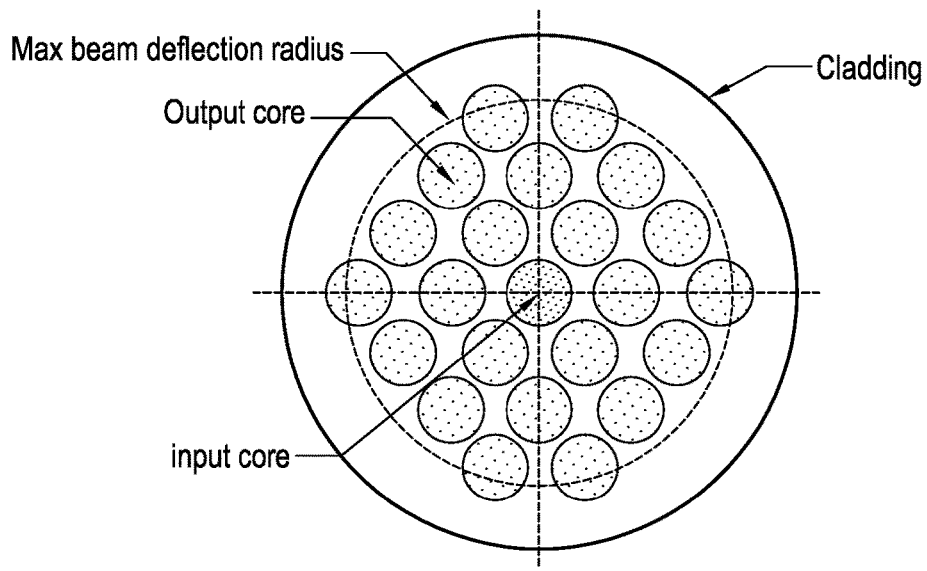
FIG. 10 shows an example of multi-core fibre in which red (dark) fibre denotes an input core and blue (lighter) fibres denote the cores that lie within the maximum beam deflection radius.

The fibre array may be fabricated from individual fibres, or the output fibre array may be implemented using a multi-core fibre containing N cores, as illustrated in FIG. 10. This latter arrangement is particularly suitable in facilitating fibre when one has S stacked 1×N WSSs. Multicore fibres with a target inter-core crosstalk levels of −30 dB after 100 km are being developed.

Referring back to section 2.2 above, although embodiments of the switch may be limited in the number of discrete positions to which one can steer to due to restrictions imposed by $p_{min}$ and the limited number of pixels in a sub-hologram, $n_x \times n_y$, embodiments of the switch are nevertheless able to steer any given beam with great accuracy. For example, a sub-hologram with 60×60 pixels, and 128 phase levels can steer with an accuracy of around 5 arc seconds. As a result, any fabrication errors associated with a multicore fibre may be compensated for by optimizing the sub-hologram phase patterns.

3.5. Separation of Input Port from Zeroth Order

Figure 9:
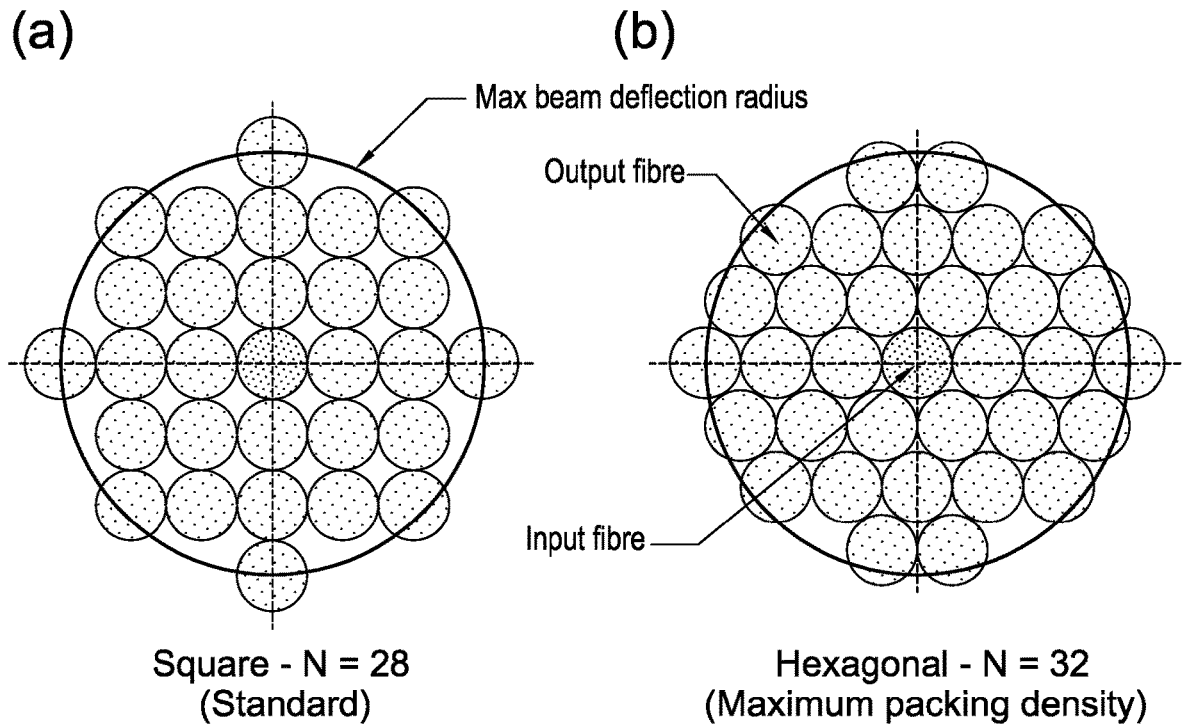
FIG. 9 shows a comparison of output port arrangement schemes illustrating (a) a rectangular grid port arrangement, and (b) a hexagonal port arrangement to maximize N.
Figure 11:
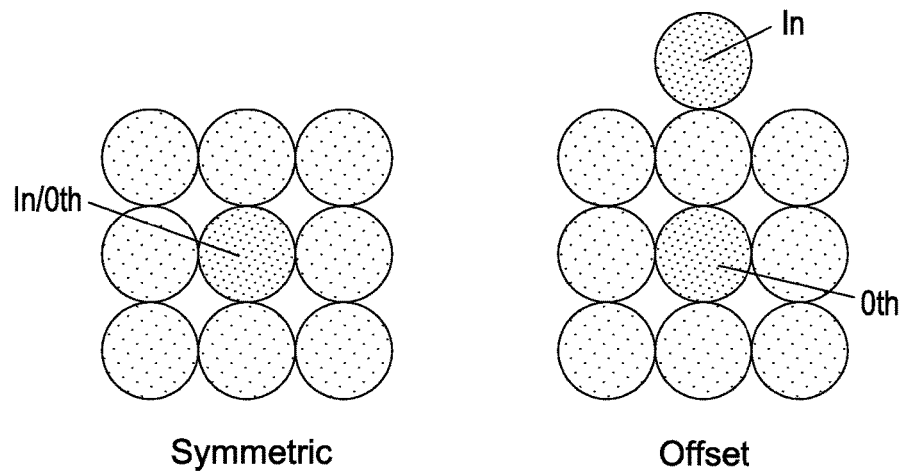
FIG. 11 illustrates separation of the input fibre and zero order output position to reduce switch back-reflections.

A potential disadvantage of the fibre schemes illustrated in FIG. 9 and FIG. 10 is that the input fibre coincides with the location of the zeroth order. In practice, the power in the zeroth order can be suppressed by approximately 20 dB with respect to the signal beam but light may then still be back-reflected from the switch. To mitigate this one may use optical isolation, at increased cost for the switch. Alternatively, one of the "output" fibres may be used as the input, and the optical system tilted such that the zeroth order is directed to the centre of the array, as shown in FIG. 11.

This zero order power may be used as a monitoring port. Alternatively, if the switch failed, it may be used as a protection express port as all channels would then be directed to this point.

3.6. Wavefront Encoding Based on Common Filtering at the Objective Lens Input Plane We have previously described a wavefront encoding technique to suppress crosstalk, in WO2012/123715. A development of this approach may be employed in the switch structure described here.

Figure 12:
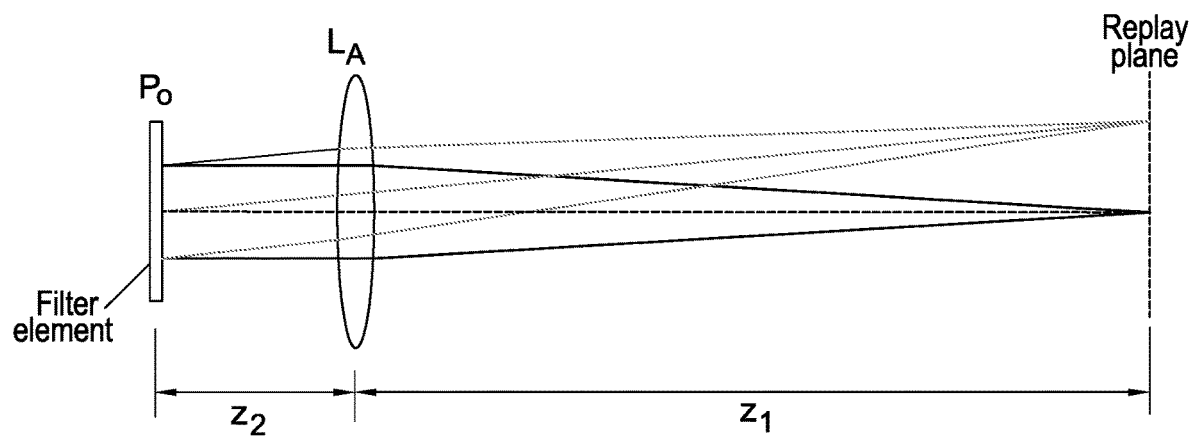
FIG. 12 shows an example of common filtering at objective lenslet input plane, $P_o$.

In particular a wavefront-modifying or "filter" element may be placed at the common input plane to the objective lenslet, that is at plane $P_o$ as shown in FIG. 12. This filter acts as a "lock" that may then be matched by a suitably modified sub-hologram phase pattern. This has the effect of only correcting for the signal beam, and causes the other diffraction orders to couple inefficiently into the output fibres, thereby reducing crosstalk. Thus a switch system as described may incorporate a (single) filter common plane for all output beams on the 1×N WSS switch structure. As in embodiments the relay system simply images the LCOS SLM plane at plane $P_o$, the implementation reduces to optimizing the output optics and the LCOS SLM hologram pattern. In the following section we discuss two example implementations of this approach in the context of the switch designs we describe.

3.6.1. Wavefront Encoding Based on a Common Axicon

Crosstalk from a blazed grating occurs due to quantization of the displayed phase pattern, which can be further exacerbated by the edge effect. The edge effect in a LCOS SLM device is a result of pixel fringing fields (the electric field due to the voltage applied to a pixel leaking across to neighbouring pixels) and liquid crystal material effects, and causes errors in the displayed phase profile (we have described techniques to mitigate this in WO2012/110811). As described in WO2012/123715, we can suppress crosstalk using an Axicon phase structure. For the purposes of the present switch design, we use wavefront encoding based on an Axicon phase element as follows:

An element with an Axicon phase profile, which is characterised by a variation in phase that is linear with respect to radius, is placed at the input objective plane. We denote this element as A1.

This element may be a high resolution diffractive optical element, or refractive component.

If the wavefront leaving the LCOS SLM is simply a plane wave with a certain propagation vector k(p,q>,A), the output at the fibre plane will comprise a series of rings as opposed to Gaussian beams.

By adding a counter Axicon phase profile to the grating phase profile we can compensate for the Axicon phase profile of A1.

The signal beam will therefore be focused to a Gaussian beam profile.

Higher and symmetric diffraction orders are focused to rings.

The approach here is that a ring focus may be engineered to miss the fibre core, thereby minimizing crosstalk as the centre of the ring will have minimal optical power. To illustrate this approach we show simulated replay fields in FIG. 13 for three cases:

1) The sub-hologram displaying a blazed grating with no common filter element.
2) The sub-hologram displaying a blazed grating, and the common filter element displaying a quantized Axicon (quantization finer than the LCOS SLM pixel size).
3) The sub-hologram displaying a phase pattern that is a combination of the blazed grating and an inverse of the common filter Axicon phase profile.

Figure 13:
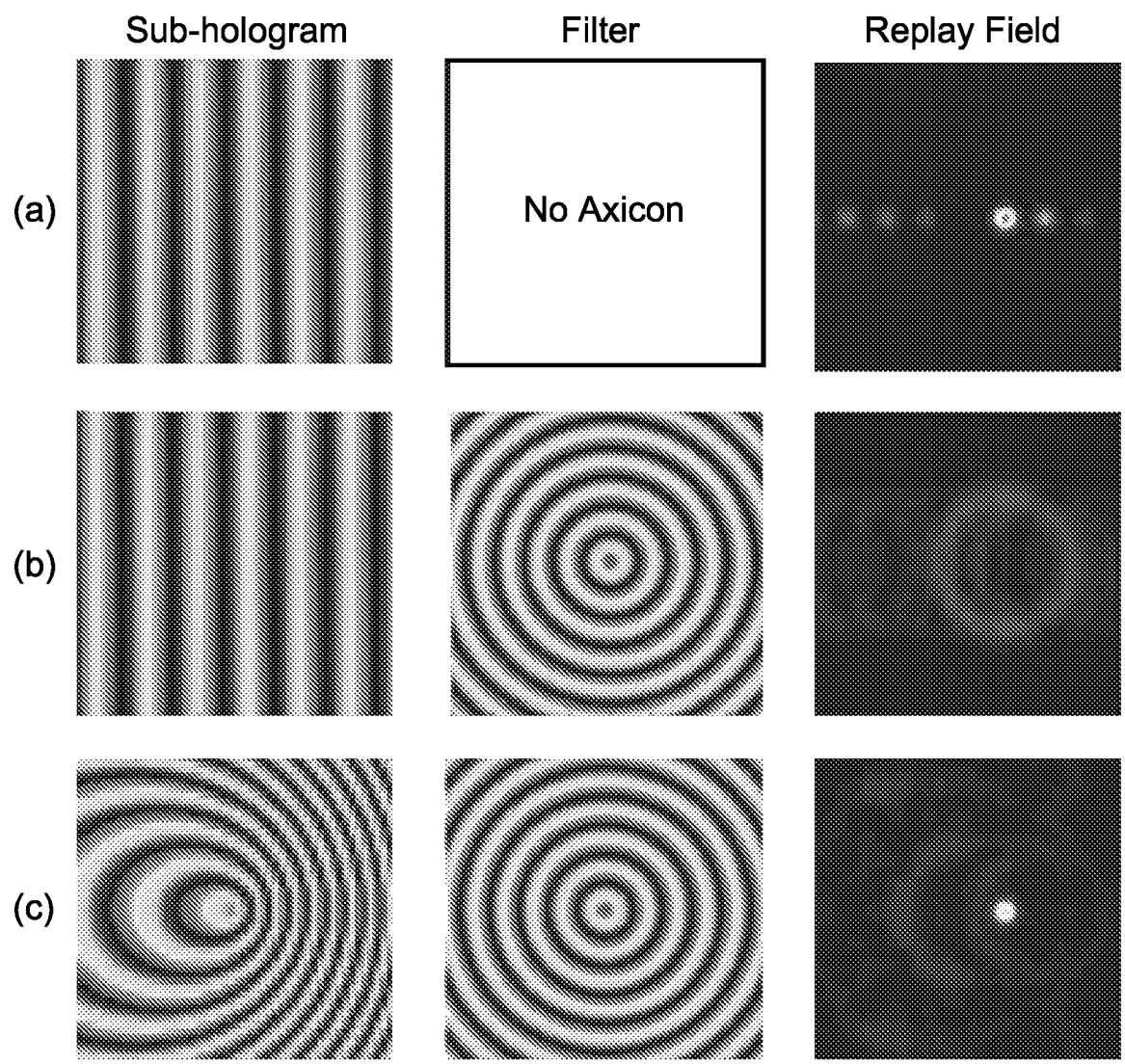
FIG. 13 illustrates an example of common filtering at objective lens input plane using an axicon phase component.

In FIG. 13 the columns show the phase pattern at the sub-hologram plane, the filter, and the corresponding replay plane. The rows show (a) grating and no Axicon, (b) grating and Axicon, and (c) modified grating (grating plus compensating Axicon phase profile) and Axicon. As can be seen, in (c) the higher and symmetric crosstalk orders of (a) are now spatially dispersed into effectively rings, whilst the signal beam is still focused. For this specific simulation, the calculations assume a sub-hologram of 50×50 pixels with an incident Gaussian beam radius one fifth of the sub-hologram size. The grating period is eight pixels, and the Axicon slant angle is 3°. A total of 128 phase levels are assumed, and the nematic liquid crystal edge effect is included in the simulation.

3.6.2. Wavefront Encoding Based on a Common Matched Spatial Filter

The element shown in FIG. 12 may also comprise a matched spatial filter, for example of the type used in optical correlator technology and optical data encryption. The phase profile of the filter may be optimized to diffract light away from the fibre cores unless an inverse phase profile is added to the grating phase profile. It should be noted that the common matched spatial filters in a stacked 1×N WSS may be implemented using the LCOS SLM, thereby allowing for possible reconfiguration. An advantage of this approach is that one can optimize the matched spatial filter phase profile to minimize crosstalk in an arbitrary manner.

3.6.3. Wavefront Encoding Based on Defocus

In a further approach one can suppress crosstalk by adding focal power to the sub-hologram and by realigning the optical planes such that only the +1 order is focused at the fibre plane. In this case no additional element need be used at the input plane of the objective lens as the objective lens itself is essentially the filter.

4. DESIGN OF A STACKED 1×N WSS MODULE

Now referring back once again to FIGS. 1 and 2, these illustrate an embodiment of the stacked 1×N WSS optical architecture shown in FIG. 4. This is derived from the 1×8 WSS embodiment of FIGS. 5 and 6. As each 3×3 fibre cluster is located at a different lateral position in the y-direction, on passing through the relay lenses ($L_1$ and $L_2$) and the DEMUX grating, the input signals from the S (1×8) WSS input ports will be:

Still be dispersed in the x-direction.

Imaged at different lateral positions in the y-direction. As a result, independent rows of sub-holograms can be used to control the signal routing for each of the M switches. As shown in FIG. 6 and FIG. 15, the light is inverted by the 4f relay optics.

One can therefore implement S individual 1×8 WSSs using a common relay system ($L_1$ and $L_2$), a common DEMUX grating ($P_g$), a single SLM, and an array of S objective lenses ($L_4$) and a set of S (3×3) fibre arrays spaced along the y-axis of the system.

In terms of scalability, a 4K LCOS SLM based on sub-holograms of size 50×50 pixels for a 50 GHz channel slot can support up to S=40 individual 1×N WSSs, with N=8 for a square packed output array, and N=12 for a Hexagonally packed output array. These values for N assume a minimum average number of pixels per period of 7.5 pixels.

5. OPERATION OF MODULE AS AN N×N WSS

The switch architecture we describe here involves a series of 1×N and N×1 WSSs in conjunction with a shuffle network. Referring back once again to FIG. 3, this illustrates how practically 1×N and N×1 WSSs in conjunction with a shuffle network can be used to implement a non-blocking N×N WSS. In this illustration we outline the architecture of a 4×4 WSS. It comprises four 1×4 WSSs, four 4×1 WSSs, and a 16×16 shuffle network. Note that only one example switching pattern is illustrated in this figure. In practice the switch can support any channel from a specific input port being routed to any output port as long as there is no conflict where the same wavelength is sent from two or more input ports to the same output port. Here we define the 4×4 WSS as a module.

In operation:

Four sets of wavelength channels enter the module (each set up wavelengths has a separate symbol, and the four wavelengths are differentiated by colour).

Each set of wavelength channels enters via a separate 1×4 WSS.

Each 1×4 switch routes wavelength channels to one of the four output fibres associated with it.

On the output side, each 4×1 WSS has four input fibres and one output fibre.

The four output fibres from any 1×4 switch are connected to a different 4×1 WSS on the output side. The resulting fibre interconnection pattern is commonly referred to as a perfect shuffle network.

Each 4×1 WSSs combines its four inputs such that they exit the switch via the single output fibre.

The output of the module therefore comprises four output fibres, with four sets of arbitrarily switched wavelength channels on each.

Contention will occur if we attempt to route the same wavelength channel from two or more input fibres to the same output fibre.

To implement the shuffle portion of the architecture of FIG. 3 one can either, for example:

Use a fibre shuffle network connected to the 1×N and N×1 WSS input/output ports.

Implement the shuffle network using free-space optics.

An equivalent planar lightwave circuit that may include such functionalities as channel monitoring for active alignment.

The module of FIG. 3 may also be configured as a more general, but smaller capacity, P×Q switch, where:

N denotes the maximum number of output ports a basic 1×N WSS can support.

P is the number of input ports to the switch module, where P≤N.

Q is the number of output fibres to the switch module, where Q≤N.

6. OPERATION OF MODULE AS A COLLECTION OF INDEPENDENT 1×N AND N×M WSSS

The flexibility of the stacked 1×N WSS design also allows the implementation of a mixed scheme of switches. For example by reconfiguring the fibre array that takes data into and out of the switch module, and by reconfiguring the fibre connections between switches, embodiments of the switch module may be configured to implement one or more of the following, in embodiments simultaneously:

One or more 1×N WSSs.

One or more N×1 WSSs.

One or more P×Q WSSs, where P≤N, and Q≤N.

Any combination thereof (potentially simultaneously, as a collection of discrete devices).

Embodiments of a switch of the type we describe employing, for example, a 4K resolution LCOS SLM could potentially support, for example, up to forty individual 1×12 WSSs operating over the C-band, or a 12×12 WSS, or a 12×12 WSS and sixteen 1×12 or 12×1 WSSs.

Summary

In some preferred implementations the switch use square (or rectangular) sub-holograms, preferably with three or more rows of sub-holograms, preferably steering the demultiplexed beams in two-dimensions, preferably arranging the output ports as a two-dimensional array. Thus some preferred implementations use a relay system based on spherical optics to simultaneously direct wavelength channels to square sub-holograms.

Preferably embodiments of the system use a single objective lenslet per 1×N WSS. In some embodiments each array of output ports may be clustered behind a common telecentric lens array (in embodiments one lens/lenslet per port array). However in embodiments the optics need not be telecentric. Moreover a port array need not be a square (or rectangular) array and in embodiments a hexagonal array is employed to increase port count.

In embodiments optical separation between the output ports may be improved by employing either a magnification stage after the relay optics, more particularly after a virtual input/output plane in the system (optionally with a further lens/lenslet array); or by employing the objective lens/lenslet array in a non-telecentric configuration. Both these approaches help to mitigate crosstalk.

Steering in two dimensions is advantageous as the total pixel count of the square (or rectangular) sub-holograms may be relatively smaller than if steering in one dimension, and more output ports may be provided, for example 8 (N=8) in a square or rectangular array, or 12 (N=12) in a hexagonal array. Clustering the output fibres is advantageous in part because it facilitates the use of multi-core fibres to support the N output ports, which in turn simplifies fibre handling and switch interfacing.

When using a displayed grating for switching one consequence of using a square or hexagonally packed arrangement of output ports is that when determining a diffraction pattern to display attention need only be given to optimising the −1, +1 and $0^{th}$ orders, which simplifies the sub-hologram. Moreover by offsetting the input fibre away from the centre of an array and/or by tilting the system (more specifically by tilting the SLM at an angle with respect to an axis of the input signals), in particular such that the $0^{th}$ order is launched into the central output fibre (which may then be unused), one can substantially maintain port count whilst reducing the optimisation to primarily the −1 and +1 orders. This helps to reduce the need for optical isolation on the input ports to inhibit back reflection.

Optionally a staggered output fibre array may also be employed to suppress crosstalk. In embodiments this may involve longitudinally offsetting some of the N output fibres in a direction parallel to the axis of the optical fibres.

Embodiments of the systems we describe may also use wavefront encoding based on defocus to suppress residual crosstalk and/or may employ wavefront encoding using a common (spatial) filter at the objective lenslet input plane to suppress residual crosstalk. In principle the designs we have described, both in the summary of the invention section and in the detailed description, may be extended from a 1×N WSS to an M×N WSS, that is where each unit (array) has multiple inputs and outputs.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A wavelength division multiplexed (WDM) reconfigurable optical switch, the switch comprising:
   a set of arrays of optical beam connections, each comprising an array of optical outputs and having an optical input to receive a WDM input optical signal;
   a first diffractive element to demultiplex said WDM input optical signal into a plurality of demultiplexed optical input beams, and to disperse said demultiplexed optical input beams spatially along a first axis;
   first relay optics between said set of arrays of optical beam connections and said first diffractive element; and
   a reconfigurable holographic array comprising a 2D array of reconfigurable sub-holograms defining sub-hologram rows and columns;
   wherein said arrays of said set of arrays are at least one dimensional arrays extending spatially in a direction parallel to said first axis and arranged in a column defining a second axis orthogonal to said first axis;
   wherein said sub-hologram rows are aligned along said first axis, and wherein said sub-hologram columns are aligned along said second axis;
   wherein a number of said sub-hologram rows corresponds to at least a number of arrays in said set of arrays; and
   wherein each sub-hologram row is configured to receive a set of demultiplexed optical input beams at different carrier wavelengths demultiplexed from the optical input for the array of the set of arrays to which the row corresponds;
   wherein each of said sub-holograms in a sub-hologram row is reconfigurable to steer a respective wavelength channel of the WDM input signal for the array to which the sub-hologram row corresponds, towards a selected said optical output for the array; and
   wherein each said sub-hologram row is configured to steer the demultiplexed optical input beams for a respective array of the set of arrays of optical beam connections, and
   wherein the optical input of each said array defines an input axis for the array, and wherein said input axis is tilted with respect to an optical axis of said reconfigurable holographic array such that a zeroth order beam reflected from said reconfigurable holographic array avoid re-entering said optical input.

2. A WDM reconfigurable optical switch as claimed in claim 1 wherein said arrays of optical outputs are 2D arrays, and wherein each of said sub-holograms in a sub-hologram row is reconfigurable to steer a wavelength channel of the WDM input in two dimensions towards said selected optical output.

3. A WDM reconfigurable optical switch as claimed in claim 1 wherein the optical input of each said array of optical outputs is substantially coplanar with at least some of said optical outputs, and wherein said reconfigurable holographic array has an associated reflector to fold an optical path between the optical input and output of each said array.

4. A WDM reconfigurable optical switch as claimed in claim 1 wherein said first relay optics comprise non-telecentric optics; wherein the optical input of each said array defines an input axis for the array; and wherein optical output beams from said first relay optics towards the optical outputs of the array have axes which diverge away from said input axis.

5. A WDM reconfigurable optical switch as claimed in claim 1 having a virtual optical output array plane between said first relay optics and said set of arrays of optical output beam connections; and comprising telecentric magnification optics between said virtual optical output array plane and a plane defined by at least some of said optical beam connections.

6. A WDM reconfigurable optical switch as claimed in claim 1 wherein the optical outputs of each array lie in a square or hexagonal grid.

7. A WDM reconfigurable optical switch as claimed in claim 1 wherein said optical input is offset from the centre of the array, and wherein said zeroth order beam is dumped into an unused said optical output.

8. A WDM reconfigurable optical switch as claimed in claim 1 wherein modulation of said demultiplexed optical input beams elongates said beams along said first axis, and wherein said steering in two dimensions comprises deflecting a said demultiplexed optical input beam in a direction parallel to said first axis.

9. A WDM reconfigurable optical switch as claimed in claim 1 wherein a number of sub-holograms is a said sub-hologram row is controllable dependent upon bandwidth of the demultiplexed optical input beams dispersed along the sub-hologram row.

10. A WDM reconfigurable optical switch as claimed in claim 1, wherein said reconfigurable holographic array comprises a spatial light modulator (SLM), the switch further comprising a driver coupled to said SLM having a control data input to control driving said SLM with said sub-holograms to steer said demultiplexed optical input beams from the optical inputs of each of said set of arrays to selected said optical outputs of the arrays.

11. A WDM reconfigurable optical switch as claimed in claim 1, further comprising:

a second set of arrays of optical beam connections, each having an optical output to provide a WDM output optical signal and comprising an array of optical inputs; wherein each optical input of said second set of arrays is optically coupled to an optical output of said set of arrays of said switch;
- a second diffractive element to disperse input beams from said second set of arrays spatially along a third axis;
- second relay optics between said second set of arrays of optical beam connections and said second diffractive element;
- a second reconfigurable holographic array comprising an array of reconfigurable sub-holograms defining second sub-holograms rows and columns;
- wherein said second sub-hologram rows are aligned along said third axis and wherein each second sub-hologram row is configured to receive said dispersed input beams from one of said second set of arrays; and wherein each of said sub-holograms is a second sub-hologram row is reconfigurable to steer a respective input beam towards the optical output of an array of the second set of arrays to which the second sub-hologram row corresponds.

12. A WDM reconfigurable optical switch as claimed in claim 11 comprising one or more drivers to control said reconfigurable holographic array and said second reconfigurable holographic array in tandem to route a selected wavelength channel from a selected optical input of said switch to a selected optical output of said second set of arrays.

13. A WDM reconfigurable optical switch as claimed in claim 1, wherein said optical input is offset from the centre of the array, and wherein said zeroth order beam is dumped into the centre of the array.

* * * * *